United States Patent
Qiao et al.

(10) Patent No.: US 10,771,633 B2
(45) Date of Patent: Sep. 8, 2020

(54) ECHO CANCELLATION METHOD AND TERMINAL, COMPUTER STORAGE MEDIUM

(71) Applicant: TENCENT TECHNOLOGY (SHENZHEN) COMPANY LIMITED, Shenzhen (CN)

(72) Inventors: Ningbo Qiao, Shenzhen (CN); Junbin Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 37 days.

(21) Appl. No.: 16/198,167

(22) Filed: Nov. 21, 2018

(65) Prior Publication Data

US 2019/0124206 A1 Apr. 25, 2019

Related U.S. Application Data

(63) Continuation of application No. PCT/CN2017/092079, filed on Jul. 6, 2017.

(30) Foreign Application Priority Data

Jul. 7, 2016 (CN) .......................... 2016 1 0539399
Aug. 4, 2016 (CN) .......................... 2016 1 0632872

(51) Int. Cl.
*H04M 9/08* (2006.01)
*H04M 1/58* (2006.01)

(52) U.S. Cl.
CPC ............. *H04M 9/082* (2013.01); *H04M 9/08* (2013.01); *H04M 1/58* (2013.01)

(58) Field of Classification Search
CPC ........ H04M 9/082; H04M 3/002; H04M 9/08; H04M 3/568; H04M 1/6041; H04M 7/006;

(Continued)

(56) References Cited

U.S. PATENT DOCUMENTS 5,379,338 A * 1/1995 Umemoto ........... H04M 1/6075
                                                        379/388.03
5,463,618 A * 10/1995 Furukawa .............. H04B 3/234
                                                        370/290

(Continued)

FOREIGN PATENT DOCUMENTS

CN          101321201        12/2008
CN          102381272         3/2012

(Continued)

OTHER PUBLICATIONS

International Search Report dated Sep. 1, 2017 in PCT/CN2017/092079, filed Jul. 6, 2017 (w/English-language translation), 8 pages.

(Continued)

*Primary Examiner* — Akelaw Teshale
(74) *Attorney, Agent, or Firm* — Oblon, McClelland, Maier & Neustadt, L.L.P.

(57) ABSTRACT

Described is an echo cancellation method including buffering the at least one frame of a first voice signal, the at least one frame of the first voice signal including an echo signal, when the at least one frame of signal is preprocessed, separately obtaining, in a first timing period, the at least one frame of the first voice signal from a buffer and at least one frame of a reference signal matching the at least one frame of first voice signal from a reference signal queue, so that an estimated latency value, between each frame of first voice signal and a corresponding reference signal, remains within a preset range, performing echo cancellation processing on the echo signal in the at least one frame of first voice signal using the at least one frame of reference signal, to obtain a second voice signal, and outputting the second voice signal.

30 Claims, 17 Drawing Sheets

(58) Field of Classification Search
CPC .. H04M 7/125; H04M 1/60; H04M 2203/509;
H04M 7/0087; H04M 9/085; H04M 1/24;
H04M 1/58; H04M 2207/18; H04M
3/2236; H04M 3/26; H04M 3/34; H04M
3/569; H04M 9/087; G10L 2021/02082;
G10L 21/0208; G10L 21/02; H04B 3/23;
H04B 3/234; H04B 3/20; H04B 3/237;
H04B 3/238; H04R 3/02; H04R 3/005;
H04R 2499/11; H04R 2430/20; H04R
2499/13; H04R 29/001; H04R 3/002;
H04R 1/406; H04R 2203/12; H04R
2410/05; H04R 27/00; H04R 29/00;
H04R 29/005; H04R 3/00; H04R 3/04;
H04R 1/026; H04R 1/08; H04R 1/1083;
H04R 1/22; H04R 2201/403; H04R
2410/01; H04R 2420/07; H04R 2430/03;
H04R 2499/15; H04R 29/004; H04R
29/008; H04R 3/12; H04R 5/02; H04R
5/027
See application file for complete search history.

(56) References Cited

U.S. PATENT DOCUMENTS

| | | | | |
|---|---|---|---|---|
| 5,594,719 A * | 1/1997 | Oh | | H04B 3/23 |
| | | | | 370/286 |
| 6,434,235 B1 | 8/2002 | Minkoff | | |
| 6,510,225 B1 * | 1/2003 | Robertson | | H04B 3/238 |
| | | | | 379/406.01 |
| 6,542,611 B1 * | 4/2003 | Lane | | H04B 3/23 |
| | | | | 381/66 |
| 6,795,547 B1 * | 9/2004 | Bjarnason | | H04M 1/6033 |
| | | | | 379/387.02 |
| 6,901,368 B1 * | 5/2005 | Ono | | G10L 19/167 |
| | | | | 704/500 |
| 8,027,476 B2 * | 9/2011 | Miura | | H04S 1/002 |
| | | | | 381/17 |
| 9,865,274 B1 * | 1/2018 | Vicinus | | G10L 19/20 |
| 2004/0252827 A1 * | 12/2004 | Sasaki | | H04M 9/082 |
| | | | | 379/406.08 |
| 2006/0250998 A1 * | 11/2006 | Beaucoup | | H04R 3/005 |
| | | | | 370/286 |
| 2007/0162571 A1 * | 7/2007 | Gupta | | H04N 21/44012 |
| | | | | 709/219 |
| 2010/0226492 A1 * | 9/2010 | Takada | | H04M 9/082 |
| | | | | 379/406.08 |
| 2014/0023199 A1 * | 1/2014 | Giesbrecht | | G10L 21/0216 |
| | | | | 381/71.1 |
| 2014/0192993 A1 * | 7/2014 | Mikami | | H04R 3/02 |
| | | | | 381/71.4 |

FOREIGN PATENT DOCUMENTS

| | | | |
|---|---|---|---|
| CN | 103312913 | | 9/2013 |
| CN | 103312913 A | * | 9/2013 |
| CN | 104822001 A | | 8/2015 |
| CN | 104902116 | | 9/2015 |
| CN | 104902116 A | * | 9/2015 |
| CN | 105472191 A | | 4/2016 |

OTHER PUBLICATIONS

Chinese Office Action Issued in CN201610632872.9 dated Apr. 25, 2019, with concise English Translation (7 pages).
Chinese Office Action Issued in CN201610539399.X dated Apr. 8, 2020, with concise English Translation (7 pages).

* cited by examiner

ECHO CANCELLATION METHOD AND TERMINAL, COMPUTER STORAGE MEDIUM

RELATED APPLICATION

This application is a continuation of International Application No. PCT/CN2017/092079, filed on, Jul. 6, 2017, which claims priority to Chinese Patent Application No. 201610539399.X, and Chinese Patent Application No. 201610632872.9 filed on Jul. 7, 2016 and Aug. 4, 2016, which are incorporated by reference in their entirety.

FIELD OF THE TECHNOLOGY

The present disclosure relates to the technical field of voice communication, and in particular relates to an echo cancellation method and terminal and a computer storage medium.

BACKGROUND OF THE DISCLOSURE

Along with the development of the Internet technology, a great diversity of information exchange manners are available. Due to usability and perfect function, intelligent terminals play an increasingly important role in information exchange. Voice function is an important function in intelligent terminals, such as voice identifying, voice communication, and recording, which are all functions commonly used by users in daily life. However, during propagation, sound loss occurs, and the problems of noise interference and the like exist, which will affect a processing effect implementing the voice tone replay or precise identifying of the abovementioned voice function.

Taking a double-terminal call scenario as an example, for example, in application based on a conference device, a telephones or voice chat, the echo cancellation technology can be adopted, to improve call quality. In the echo cancellation technology, a reference signal and an echo signal are adopted for performing echo cancellation. The so-called reference signal refers to: a far end signal, that is, a voice signal obtained by playing in a speaker playing terminal, for example, a signal generated by decoding a voice sent by a terminal device A by calling a playing thread drive decoding unit. The so-called echo signal refers to: a near end signal, that is, a voice signal collected in a microphone collection terminal, for example, a signal generated by decoding a voice collected at a sound card through calling a collecting thread drive decoding unit by a terminal device B, and then echo cancellation processing is performed in a collection thread. The echo signal can be obtained after the reference signal undergoes attenuation and/or noise interference in the propagation process.

Echo latency exists between the reference signal and the echo signal, in related technology, echo cancellation processing needs to be performed in order to avoid relative latency of the reference signal and the echo signal caused by echo latency. In current technology, echo cancellation processing is usually performed aiming at a current frame of signal, and due to relatively great fluctuation of a difference between the length of a reference signal buffer and the length of an echo signal buffer, an echo path needs to be re-estimated frequently, the stability and precision of an echo cancellation effect are low, and the current frame of signal cannot comprehensively assess the overall sound variation state. Currently, no effectively resolving solution is available for this problem.

SUMMARY

The present disclosure provides an echo cancellation method and terminal, and a computer storage medium, can resolve the abovementioned problems existing in the related technology.

In one aspect, the present disclosure provides an echo cancellation method, including:

collecting at least one frame of a first voice signal;

buffering collected the at least one frame of the first voice signal, the at least one frame of the first voice signal comprising including an echo signal;

when the at least one frame of the first voice signal is preprocessed, separately obtaining, in a first timing period, separately obtaining the at least one frame of the first voice signal from the a buffer, and obtaining at least one frame of a reference signal matching the at least one frame of the first voice signal from a reference signal queue, so that an estimated latency value, between each frame of the first voice signal and a corresponding reference signal, remains within a preset range; and performing, by processing circuitry of an information processing apparatus, echo cancellation processing on the echo signal in the at least one frame of the first voice signal by using the at least one frame of the reference signal, to obtain generate at least one frame of a second voice signal; and outputting the at least one frame of the second voice signal.

In the second aspect, the present disclosure provides a terminal for echo cancellation, and the terminal having a function implementing the echo cancellation method provided according to the first aspect. The function may be implemented by hardware such as processing circuitry, and may also be implemented by executing corresponding software via the hardware. The software comprises one or more units corresponding to the function, and the unit maybe software. The functions of the units may alternatively be implemented in hardware alone or by a combination of software and hardware. The terminal comprises processing circuitry that collects at least one frame of a first voice signal.

buffers the at least one frame of the first voice signal in a first buffer, the at least one frame of the first voice signal including an echo signal, triggers a first timing period, when at least one frame of the first voice signal is preprocessed, separately obtains in the first timing period, the at least one frame of the first voice signal from the first buffer and at least one frame of a reference signal matching the at least one frame of the first voice signal from a reference signal queue, so that an estimated latency value between each frame of the first voice signal and the corresponding reference signal remains within a preset range, performs, using the at least one frame of the reference signal, echo cancellation processing on the echo signal in the at least one frame of the first voice signal, to obtain at least one frame of a second voice signal, and outputs the at least one frame of the second voice signal.

In the third aspect, the present disclosure provides an echo cancellation method, including:

controlling playing, using processing circuitry, of a reference signal obtained from a far end, the reference signal being at least one frame of a first signal;

collecting an echo signal, the echo signal being a signal obtained after the reference signal is played and undergoes attenuation and noise interference in a voice propagation process, and the echo signal being at least one frame of a second signal;

respectively obtaining, when at least one frame of the first signal is preprocessed, a first characteristic value, corresponding to the at least one frame of the first signal, from the at least one frame of the first signal and a second characteristic value, corresponding to the at least one frame of the second signal, from the at least one frame of the second signal;

performing a cross-correlation operation, by the processing circuitry, on the first characteristic value of the at least one frame of the first signal and the second characteristic value of the at least one frame of the second signal, to obtain a cross-correlation parameter; and performing echo cancellation processing, by the processing circuitry, based on the cross-correlation parameter.

In the fourth aspect, the present disclosure provides a terminal for echo cancellation, the terminal having a function implementing the echo cancellation method provided according to the first aspect. The function may be implemented by hardware such as processing circuitry, and may also be implemented by executing corresponding software via the hardware. The software comprises one or more units corresponding to the function, and the unit maybe software. The functions of the units may alternatively be implemented in hardware alone or by a combination of software and hardware. The terminal comprises processing circuitry that controls playing of a reference signal obtained from a far end, the reference signal being at least one frame of a first signal, collects an echo signal, the echo signal being a signal obtained alter the reference signal is played and undergoes attenuation and noise interference in a voice propagation process, and the echo signal being at least one frame of a second signal, respectively obtains, when at least one frame of the first signal is preprocessed, a first characteristic value, corresponding to the at least one frame of the first signal, from the at least one frame of the first signal and a second characteristic value corresponding to the at least one frame of the second signal, from the at least one frame of the second signal, performs a cross-correlation operation on the first characteristic value of the at least one frame of the first signal and the second characteristic value of the at least one frame of the second signal, to obtain a cross-correlation parameter, and performs echo cancellation processing based on the cross-correlation parameter.

In the fifth aspect, the present disclosure provides a non-transitory computer storage medium, the non-transitory computer storage medium storing a computer executable instruction, and the computer executable instruction being used to perform the echo cancellation method according to any one of the abovementioned solutions.

By adopting the embodiment of the present disclosure, before echo cancellation, at least one frame of signal is preprocessed, and the overall sound variation state may be comprehensively assessed, to improve echo cancellation stability and precision. Specifically, in the echo cancellation process, in one aspect, while meeting the condition that the estimated latency value between each frame of first voice signal and a corresponding reference signal remains within a preset range, the at least one frame of reference signal is used to perform echo cancellation processing on the echo signal in the at least one Same of first voice signal, and therefore, the problem of relatively great fluctuation of the difference of the length of the reference signal buffer and the length of the echo signal buffer may be avoided, and further echo cancellation stability and precision are improved. In another aspect, by performing cross-correlation operation on the characteristic value of the first signal and the characteristic value of the second signal, obtained from at least one frame of first signal and second signal, cross-correlation parameters c an be obtained, and echo cancellation can be performed according to the cross-correlation parameters, to exclude information irrelevant to the characteristic values, and therefore, echo cancellation stability and precision are improved.

DESCRIPTION OF EMBODIMENTS

Figure 1:
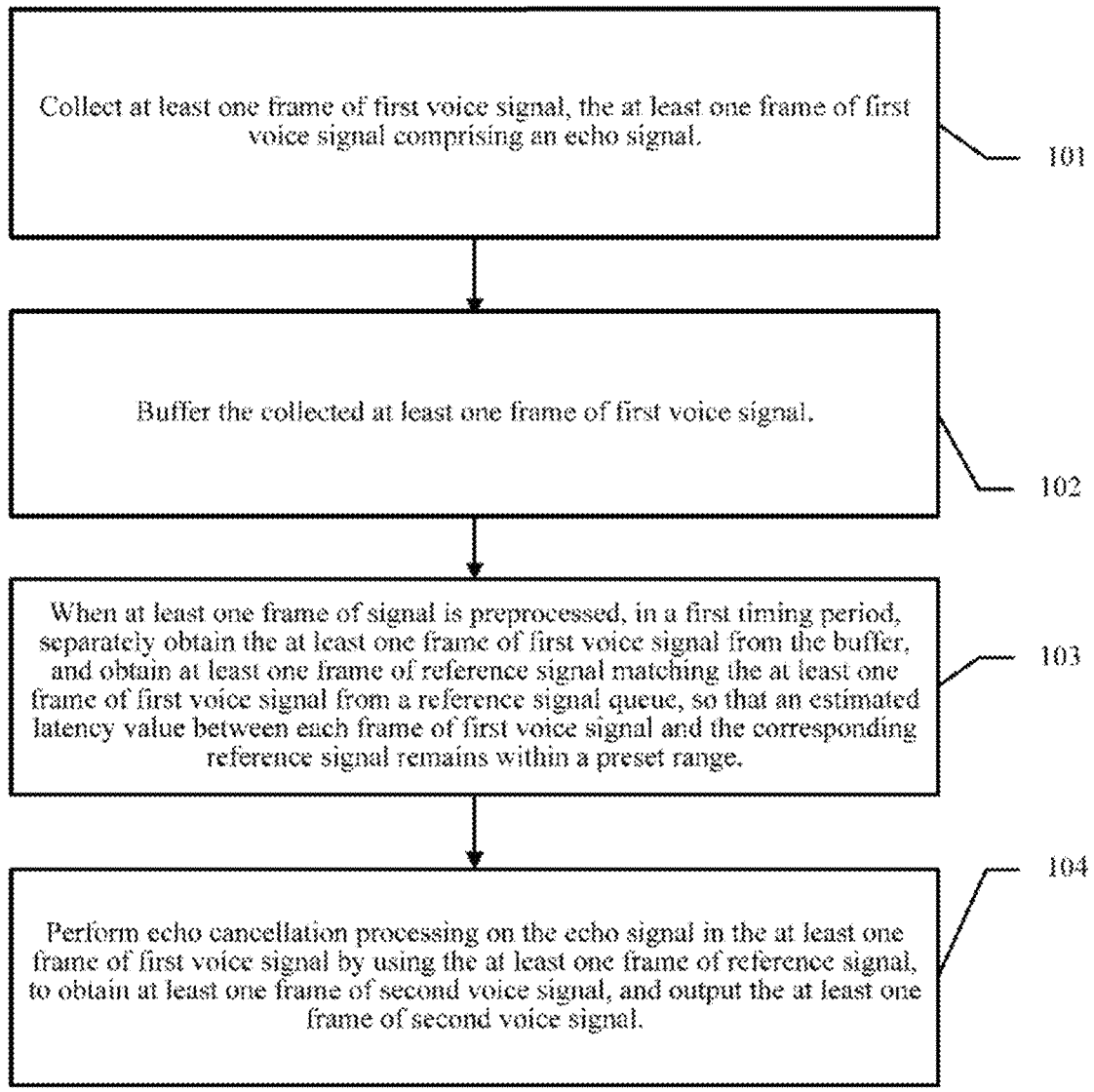
FIG. 1 is a schematic flowchart of the echo cancellation method in the present embodiment.

Mobile terminals of all embodiments of the present disclosure will be described by referring to the accompanying drawings here. In the subsequent descriptions, suffixes of "modules", "components" or "units" representing elements are only used for the sake of facilitating the illustration of the embodiments of the present disclosure, and do not have specific meanings per se. Therefore, "modules" and "components" may be used interchangeably.

The following described embodiments are only some of the embodiments of the present disclosure rather than all of the embodiments. All other embodiments obtained by a person of ordinary skill in the art based on the embodiments of the present disclosure shall fall within the protection scope of the present disclosure.

In the following detailed descriptions, many concrete details are stated in order to thoroughly understand the present disclosure. However, obviously, a person of ordinary skill in the art can implement the present disclosure without these concrete details. In other conditions, detailed description is not made for public common methods, processes, assemblies, circuit and network, to avoid unnecessary blurring of all aspects of the embodiments.

In addition, although terms "first", "second" and the like are adopted for many times for describing various elements (or various threshold values or various applications or various instructions or various operations) and the like, these elements (or threshold values or applications or instructions or operations) should not be limited by these items. These terms are only used to differentiate one element (or threshold value or application or instruction or operation) from another element (or threshold value or application or instruction or operation). For example, first operation can be referred to as second operation, and the second operation can also be referred to as the first operation, without deviating from the scope of the present disclosure, the first operation and the second operate are both operations, and the only difference is that these two are not the same operations.

Steps in the embodiment of the present disclosure do not need to be processed according to the described step sequence, steps can be disordered for rearrangement, or steps in the embodiments are cancelled, or steps in the embodiments are increased optionally according to requirements, step description in the embodiments of the present disclosure is only an optional sequence combination and does not represent all step sequence combinations of the embodiments of the present disclosure, and step sequence in the embodiments should not be regarded as limitation to the present disclosure.

Terms "and/or" in the embodiments of the present disclosure refer to any and all possible combinations including one or more of associated listed items. What needs to be further illustrated is that: when being used in the present specification, "comprise and/or contain" specify/specifies the existence of the stated characteristics, integers, steps, operations, elements and/or components, without exclusion of existence or addition of one or more other characteristics, integers, steps operations, elements and/or components and/or their groups. "Comprise" and "have" and any variants of the two intend to cover a nonexclusive inclusion, for example, processes, methods, systems, products or devices containing a series of steps or units need not to be limited to those clearly listed steps or units, and can comprise other steps or units which are not clearly listed or are inherent for these processes, methods, products or devices; division of the units shown in the present disclosure is only logic division, and other division manners may exist in practical application, for example, multiple units can be combined or integrated in another system, or some characteristics may be ignored or not be executed; in addition, the displayed or discussed mutual coupling or direct coupling or communication connection may be implemented by some interfaces, indirect coupling or communication connection between units can be implemented in electric or other similar manners, which are not defined in the present disclosure. Moreover, units or subunits described as separation parts can be and can also not be physical separation, can be and can also not be physical units, or may be distributed in multiple circuit units, and partial or all units therein can be selected according to actual requirements to realize the objective of the solution of the embodiments of the present disclosure.

"At least one flame" and "multiple flames" in the embodiments of the present disclosure both express: one frame or more than one frame of voice signals. The voice signal is not limited to the reference signal and the echo signal.

In an application scenario of the embodiment of the present disclosure, due to limitation of processor performances of a terminal device and inappropriate aspects of an operating system thread scheduling mechanism, occupying time of different threads for the processor is instable, for example, because the calling frequencies of a playing thread and a collecting thread are different, frequencies for the reference signal and the echo signal to input to an echo cancellation unit are different. After call is established, because the echo path is basically determined, and the calling frequencies of the playing thread and the collecting thread are different, relative latency fluctuation, of the reference signal and the echo signal are great. One manifestation is that: fluctuation of the difference of the length of a reference signal buffer and the length of an echo signal buffer is great and under such fluctuation, the echo cancellation unit needs to re-estimate an echo path repeatedly, to adapt to the variation of latency, and thus solving a minimum estimation error; but frequent re-estimation for the echo path may cause poor stability of the working state of the echo cancellation unit.

The embodiment of the present disclosure provides an echo cancellation solution, which can stabilize the relative latency of the reference signal and the echo signal, to promote the working stability of the echo cancellation unit. The solution at least comprises: 1. after receiving a voice signal sent by a sending terminal at a receiving terminal side, generating a reference signal by using the voice signal after playing, and putting to a reference signal queue; 2. buffering the collected echo signal, the echo signal being an audio signal collected in the echo path; 3. starting a timer, inputting the echo signal and the reference signal to the echo cancellation unit in a timing period of the timer, so that the estimated latency value between the echo signal and the reference signal fills within a preset range, and then cancelling, by the echo cancellation unit, the echo signal according to the reference signal, and thus reaching the objective of effectively cancelling the echo signal.

The echo cancellation solution in the embodiment of the present disclosure will be introduced from the view of performing echo cancellation by the terminal device as a receiving party.

Referring to FIG. 1, FIG. 1 is an embodiment of the echo cancellation method of the embodiment of the present disclosure, comprising:

Step 101: Acquire at least one frame of first voice signal, the at least one frame of first voice signal comprising an echo signal.

The first voice signal refers to an audio signal recorded by a microphone of the terminal device, the audio signal comprising an audio signal played by an audio card of the terminal device and an audio signal around the terminal device. The audio signal played by the audio card can be a voice signal sent by another terminal device, for example, the voice of the other party in calling, and the audio signal around the terminal device may be the voice of a user of the terminal device and may also be any sound captured around the terminal device.

In addition, the first voice signal is collected, by a collection unit, in the echo path in the terminal device, for example, after the audio card of the terminal device plays a voice signal A sent by the terminal device at the far end, the microphone of the terminal device will record the played voice signal A and then input the recorded voice signal A to the echo path; and when echo cancellation needs to be performed on the recorded voice signal A, the voice signal A needs to be collected from the echo path, and the collected voice signal A is referred to as the echo signal.

Step 102: Buffer the collected at least one frame of first voice signal.

The first voice signal may be buffered by a first buffer, and the first buffer as a buffer space of a storage medium of the terminal device may be a buffer medium specifically used for echo cancellation, and further may be a buffer space reserved in the buffer medium, and is not specifically defined in the embodiments of the present disclosure. The buffer size (namely, the buffer size of the first voice signal) of the first buffer needs to be dynamically adjusted by referring to the minimum buffer size (Record Min Buffer Size) of an audio card recording unit. For example, the buffer size of the first voice signal can be obtained based on the minimum buffer size of the audio card recording unit in the terminal device and the first buffer coefficient. For instance, the first buffer coefficient may be defined as 1.5, that is, the buffer size of the first buffer is set to be 1.5 times of Record Min Buffer Size, to balance the latency estimation and collection stability of the echo cancellation unit, and the specific value of the first buffer coefficient is not defined herein.

The objective of buffering the first voice signal is that: after collecting the first voice signal in the echo path, inputting the first voice signal to the echo cancellation unit in the first timing period triggered by the first timer in following step 103 instead of directly inputting the collected first voice signal to the echo cancellation unit, to control the stability of estimated echo latency.

Step 103: When at least one frame of signal is preprocessed, in the first tuning period, separately obtain the at least one frame of first voice signal from the buffer and obtain at least one frame of reference signal matching the at least one frame of first voice signal from the reference signal queue, so that an estimated latency value between each frame of the first voice signal and the corresponding reference signal remains in a preset range.

When multiple frames of signals are preprocessed, in the first tuning period by triggering the first timing period by the first timer, separately obtaining multiple frames of first voice signals from the buffer and obtaining multiple frames of reference signals matching the multiple frames of first voice signals from the reference signal queue, so that an estimated latency value between each frame of the first voice signal and the corresponding reference signal remains in a preset range.

By defining that the first voice signal and the reference signal are obtained in the first timing period, the estimated latency value between the first voice signal and the reference signal has no fluctuation and is stabilized in a preset range when the echo cancellation unit performs echo latency estimation, correspondingly, two input signals (the first voice signal and the reference signal) input to the echo cancellation unit are synchronized, frame mismatching can be avoided, and thus avoiding the problems that because one input signal fails to reach the echo cancellation unit while the other one reaches the echo cancellation unit echo cannot be cancelled, and even the originally collected audio signal is damaged, resulting in sound being hard to distinguish.

It may be understood that, the first timer in the terminal device can be started after buffering of the first voice signal is completed, and the first timer can time periodically after being triggered (timing duration is the first timing period). The first timer may be a timing tool installed in the terminal device or a timer module carried by the system of the terminal device; the timer module may be implemented by using millisecond, microsecond or nanosecond timers of a real-time system, and may also realize a more accurate timing function; and a more accurate triggering period can be calculated by utilizing the time difference between a last response moment (which can be accurate to millisecond, microsecond or nanosecond) and a current moment (which can be accurate to millisecond, microsecond or nanosecond) of the timer.

Optionally, in addition, because frame lengths encoded by audio encoders of different models are different, for example, some audio encoders can encode frame length of 20 ms each, and some audio encoders can encode frame length of 23 ms each, the first timing period can be obtained based on the frame length that is selected by the audio encoder in the terminal device for encoding in order to further obtain a better echo cancellation effect for example, the first timing period triggered by the first tinier may be set as the frame length of the audio encoder and may also be calculated by adopting other calculation manners; and the specific calculation manner of the first timing period is not defined in the embodiment of the present disclosure.

Step 104: Perform echo cancellation processing on the echo signal in the at least one frame of first voice signal by rising the at least one frame of reference signal, to obtain at least one frame of second voice signal, and output the at least one frame of second voice signal.

Echo cancellation processing can be implemented by adding an echo canceller, such as a single-path echo canceller; during echo cancellation, an audio signal A from a far end is taken as a reference signal of echo cancellation, and after the microphone obtains the first voice signal containing the audio signal A from the far end from the audio card and inputs the first voice signal to the single-path echo canceller, the single-path echo canceller compares the first voice signal with the reference signal, and if it is find that the audio signal A is consistent to the reference signal by comparison, the single-path echo canceller cancels the audio signal A from the first voice signal, and therefore, the objective of echo cancellation is reached, and the second voice signal without an echo signal is obtained finally.

In the embodiment of the present disclosure, buffering the collected first voice signal; obtaining the buffed first voice signal and the reference signal in the first timing period, so that the estimated latency value between the first voice signal and the reference signal remains in a preset range; then performing echo cancellation processing on the echo signal in the first voice signal by using the reference signal to obtain a second voice signal, and outputting the second voice signal. The solution can stabilize the relative latency of the reference signal and the echo signal and promote the working stability of the echo cancellation unit.

In practical application, echo cancellation processing is performed after multiple frames of voice signals (such as the echo signal and the reference signal) are preprocessed. In the present embodiment, in order to facilitate description, "the first voice signal", etc. are used for referring to each frame of signal in multiple frames of voice signals, and a person skilled in the art should know that: each frame of signal in the multiple frames of signals is preprocessed, rather than processing only one frame.

Figure 2:
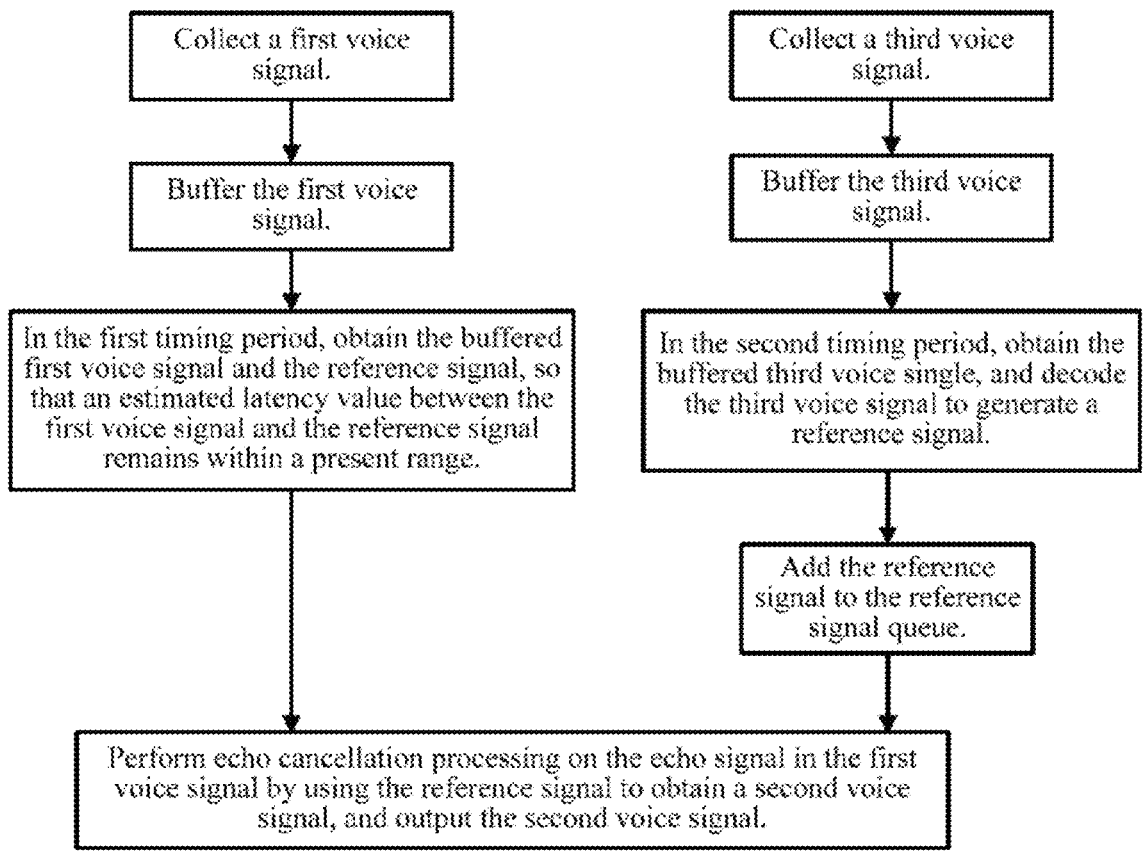
FIG. 2 is another schematic flowchart of the echo cancellation method in the present embodiment.

Optionally, in some embodiments of the present disclosure, in order to stabilize the stability of the reference signal queue and further improve the relative latency between two input signals (namely, the first voice signal and the reference signal) of the echo cancellation unit, before collecting the first voice signal, as shown in FIG. 2, the embodiment of the present disclosure further comprises the following contents:

1. Collect a received third voice signal, and buffer the received third voice signal, the first voice signal at least comprising a signal the same as the third voice signal.

The third voice signal can be buffered by the second buffer, and the second buffer as a buffer space in a storage medium of the terminal device may be a buffer medium specifically used for echo cancellation, and may also be a buffer space reserved in the buffer medium, and the first buffer and the second buffer are independent of each other, may be two logically independent buffer spaces in one buffer medium, and may also be physically independent buffer spaces. In order to increase the reading and writing efficiency, high speed buffer medium may be adopted for the first buffer and the second buffer, which is not specifically defined in the embodiment of the present disclosure.

Optionally, considering that an audio card playing unit generates a lag phenomenon more easily while playing the third voice signal than collecting the third voice signal, when the collected third voice signal is buffered, the buffer size (namely, the buffer size of the third voice signal, the length of a signal which can be buffered by the second buffer) of the second buffer needs to be dynamically adjusted by referring to the minimum buffer size (Play Min Buffer Size) of the audio card playing unit. For example, the buffer size of the third voice signal can be obtained according to the minimum buffer size of the audio card playing unit and the second buffer coefficient. For instance, the second buffer coefficient may be defined as 2, that is, the buffer size of the second buffer is set to be 2 times of Play Min Buffer Size, to relieve the problem of reference signal jittering caused by lag of the audio card playing unit and the specific value of the second buffer coefficient is not defined herein.

2. Obtain the third voice signal in a second timing period, then decode the obtained third voice signal to generate the reference signal, and add the generated reference signal into the reference signal queue, the second timing period being triggered by a second timer, and the second timer triggering timing before the first timer.

By defining that the third voice signal is obtained in the second timing period, the third voice signal is decoded to generate the reference signal, and the reference signal is added to the reference signal queue, the length of the reference signal queue is stabilized, and subsequently, the echo cancellation unit matches and extracts a reference signal corresponding to the echo signal from the reference signal queue while canceling the echo signal in the first voice signal in the first timing period, to further stabilize latency estimation of the echo cancellation unit for the echo, and therefore, the estimated latency value between the first voice signal and the reference signal has no fluctuation and is stabilized in a preset range, correspondingly, two input signals (the first voice signal and the reference signal) input to the echo cancellation unit are synchronized, frame mismatching can lie avoided, and thus avoiding the problems that because one input signal fails to reach the echo cancellation unit while the other one reaches the echo cancellation unit, echo cannot be cancelled and even the originally collected audio signal is damaged, resulting in sound being hard to distinguish.

It may be understood that, the second timer in the terminal device can be started after buffering of the third voice signal is completed, and the second timer can time periodically after being triggered (timing duration is the second timing period). The second timer may be a timing tool installed in the terminal device, or a timer module carried by the system of the terminal device; the timer module may be implemented by using millisecond, microsecond or nanosecond timers of a real-time system, and may also realize a more accurate timing function; and a more accurate triggering period can be calculated by utilizing the time difference between a last response moment (which can be accurate to millisecond, microsecond or nanosecond) and a current moment (which can be accurate to millisecond, microsecond or nanosecond) of the timer. The first timer and the second timer in the embodiments of the present disclosure are relatively independently timers, and threads for calling the two timers are fixed, for example, the first timer is called by a recording thread, and the second timer is called by a playing thread.

In addition, because frame lengths encoded by audio encoders of different models are different, for example, some audio encoders can encode frame length of 20 ms each, and some audio encoders can encode frame length of 23 ms each, it may also define that the second timing period can be obtained based on the frame length that is selected by the audio encoder in the terminal device for encoding in order to further obtain a better echo cancellation effect, for example, the second timing period triggered by the second timer may be set as the frame length of the audio encoder and may also be calculated by adopting other calculation manners; the second timing period may be the same as or different from the first timing period, and the specific calculation manner of the first timing period is not defined in the embodiment of the present disclosure.

Optionally, in some embodiments of the present disclosure, in certain scenarios, for example, the phenomena of poor network state and stagnation of a sending terminal, the terminal device cannot receive a data packet of the sending terminal, on one hand, the phenomenon that the voice signal buffered in the first buffer is emptied may occur, which causes that the echo cancellation unit has fluctuation while estimating the echo path and cannot continue the echo cancellation operation (for example, failing to match the reference signal from the reference signal queue). On the other hand, because the second buffer buffers the data packet sent by the sending terminal all the time, while a second timing-driven unit and a decoding unit generate the reference signal periodically, the reference signal queue may be lengthened, especially, in the condition that the echo cancellation unit cannot perform the echo cancellation operation, the length of the reference signal queue is more unstable. Therefore, in order to ensure the working stability of the audio card (including an audio card recording unit and an audio card playing unit) and ensure the stability of the length of the reference signal queue, collecting-playing relative latency fluctuation can be reduced and echo path estimation of the echo cancellation unit can be stabilized by filling the audio card and the reference signal queue with temporary data. For example, if there is no usable voice signal in the buffer in the first timing period, the audio card playing unit and the reference signal queue are respectively filled with the temporary data, the temporary data being a sequence comprising 0. It may be understood that, the voice signal not usable in the buffer may be the abovementioned first voice signal, indicating that the first voice signal is not buffered yet, and may also be voice signals connected in other moment, which is not specifically defined in the embodiment of the present disclosure.

The forgoing describes the echo cancellation method in the present disclosure, and the following will describe a terminal device 30 executing the echo cancellation method.

Figure 3:
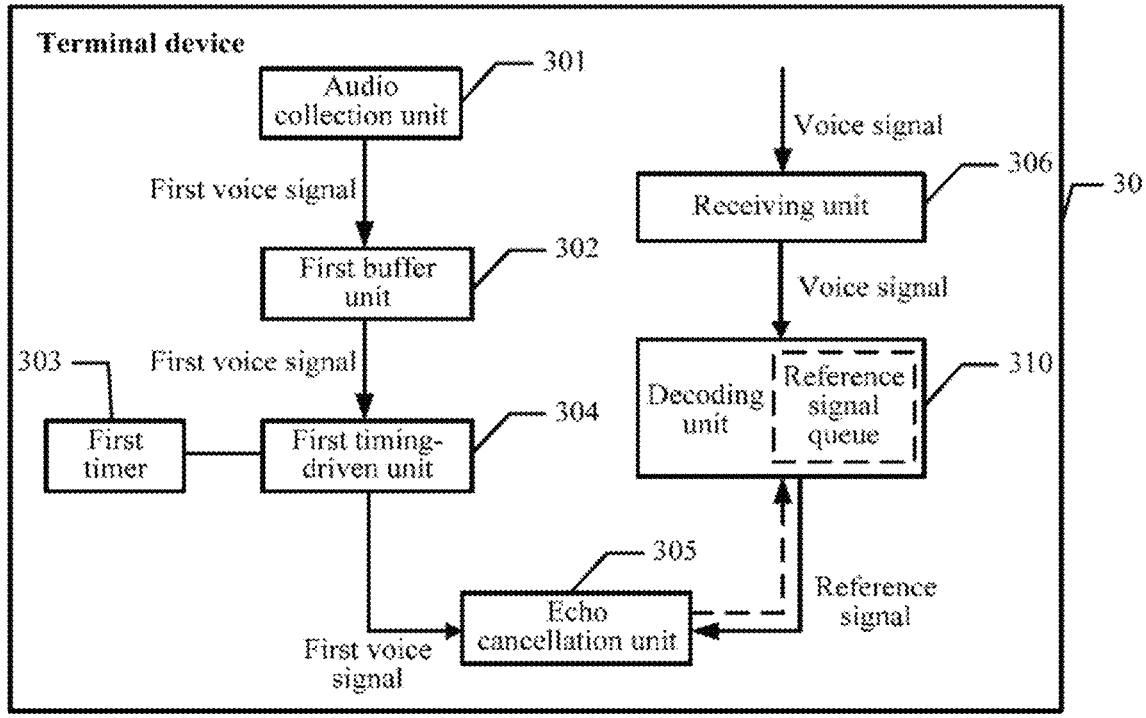
FIG. 3 is a schematic structural diagram of the terminal in the present embodiment.

Referring to FIG. 3, the terminal device 30 is described, and the terminal device comprises processing circuitry and memory implementing an audio collecting unit 301, a first buffer 302, a first timer 303, a first timing-driven unit 304 and an echo cancellation unit 305.

The audio collecting unit 301 is configured to collect the first voice signal.

The first buffer 302 is configured to buffer the first voice signal collected by the audio collecting unit 302, the objective of buffering the first voice signal being: after collecting the first voice signal in the echo path, inputting the first voice signal to the echo cancellation unit in the first timing period triggered by the first timer instead of directly inputting the collected first voice signal to the echo cancellation unit, to control the stability of estimated echo latency.

The first timer 303 is configured to trigger the first timing period.

The first timing-driven unit 304 is configured to obtain the first voice signal from the first buffer and obtain the reference signal matching the first voice signal from the reference signal queue in the first timing period of the first tinier 303, and input the first voice signal and the reference signal to the echo cancellation unit, so that the estimated latency value between the first voice signal and the reference signal remains in the preset range.

The echo cancellation unit 305 is configured to perform, by using the reference signal that is output by the first timing-driven unit 304, echo cancellation processing on the echo signal in the first voice signal that is output by the first timing-driven unit 304, to obtain a second voice signal, and output the second voice signal.

In the embodiment of the present disclosure, the first buffer 302 buffers the first, voice signal, the first timing-driven unit 304 inputs the reference signal and the first voice signal to drive the echo cancellation unit after obtaining the first voice signal from the first buffer 302 in the first timing period of the first timer 303, drives the echo cancellation unit 305 to perform echo cancellation processing on the echo signal in the first voice signal by using the reference signal, and outputs the obtained second voice signal By adopting the solution, the relative latency of the reference signal and the echo signal can be stabilized, and the working stability of the echo cancellation unit can be promoted.

Figure 4:
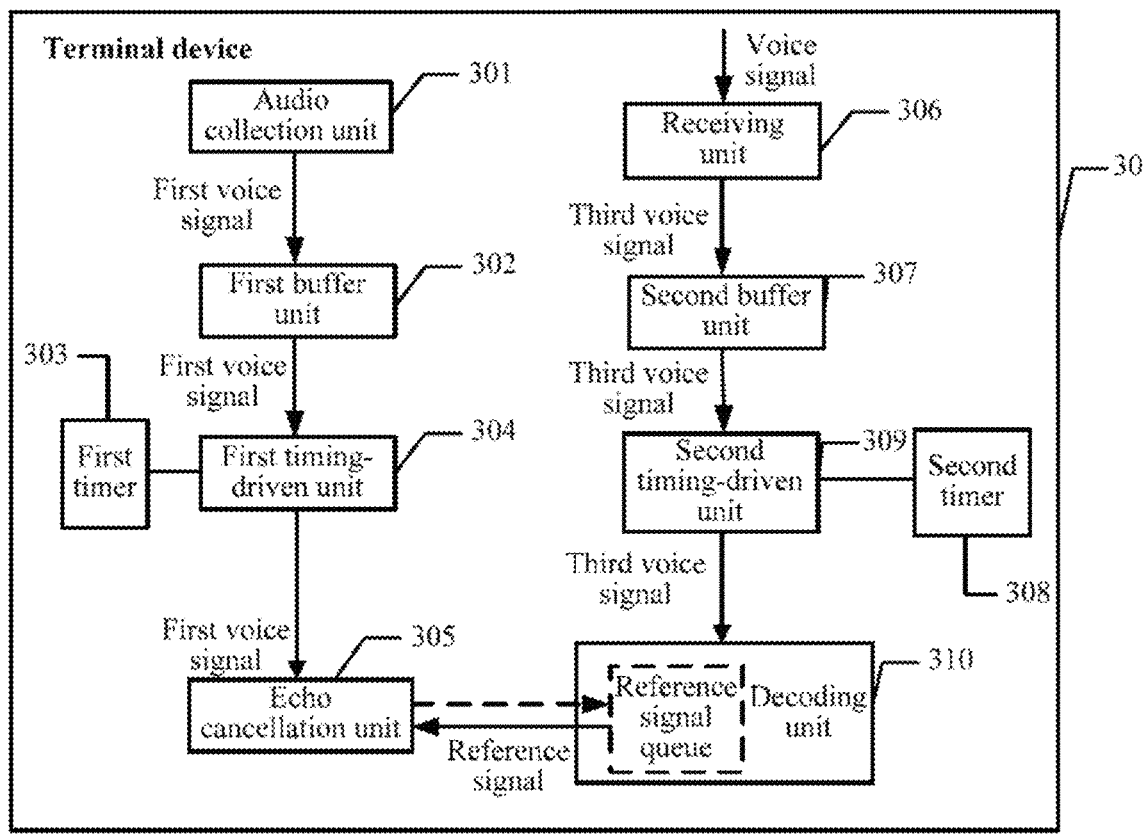
FIG. 4 is another schematic structural diagram of the terminal in the present embodiment.

Optionally, in some embodiments of the present disclosure, in order to stabilize the stability of the reference signal queue and further improve the relative latency between two input signals (namely, the first voice signal and the reference signal) of the echo cancellation unit, as shown in FIG. 4, the terminal device 30 further comprises, implemented by the processing circuitry and the memory, a receiving unit 306, a second buffer 307, a second timer 308, a second timing-driven unit 309 and a decoding unit 310.

The receiving unit 306 is configured to receive a third voice signal, the third voice signal being an audio signal sent by the sending terminal to the terminal device 30 and being played by the audio card playing unit of the terminal device 30.

The second buffer 307 is configured to buffer the collected third voice signal, the first voice signal at least comprising a signal the same as the third voice signal.

The second timer 308 is configured to trigger the second tuning period.

The second timing-driven unit 309 is configured to obtain the third voice signal from the second buffer 307 in the second timing period of the second timer, and input, to the decoding unit 310, the third voice signal that is obtained from the second buffer 307.

The decoding unit 310 is configured to decode the third voice signal that is output by the second timing-driven unit 309 to generate the reference signal, and add the generated reference signal to the reference signal queue.

Optionally, in some embodiments of the present disclosure, because frame lengths encoded by audio encoders of different models are different, for example, some audio encoders can encode frame length of 20 ms each, and some audio encoders can encode frame length of 23 ms each, it may also define that the first, timing period is obtained based on the frame length that is selected by the audio encoder for encoding and the second timing period is obtained based on the frame length that is selected by the audio encoder in the terminal device for encoding in order to further obtain a better echo cancellation effect for example, the first timing period triggered by the first timer may be set as the frame length of the audio encoder, the second timing period triggered by the second timer may be set as the frame length of the audio encoder, and the first timing period and the second timing period may also be calculated by adopting other calculation manners; the second timing period may be the same as or different from the first timing period, and the specific calculation manner of the first timing period and the second timing period is not defined in the embodiment of the present disclosure.

Optionally, in some embodiments of the present disclosure, the first buffer 302 as a buffer space in a storage medium of the terminal device may be a buffer medium specifically used for echo cancellation, and may also be a buffer space reserved in the buffer medium, which is not specifically defined in the embodiment of the present disclosure. The buffer size (namely, the buffer size of the first voice signal) of the first buffer 302 needs to be dynamically adjusted by referring to the minimum buffer size of the audio card recording unit (recording circuitry), to balance latency estimation and collection stability of the echo cancellation unit 305. For example, the buffer size of the first voice signal can be obtained based on the minimum buffer size of the audio card recording unit in the terminal device and the first buffer coefficient. For instance, the first buffer coefficient may be defined as 1.5, that is, the buffer size of the first buffer 302 is set to be 1.5 times of Record Min Buffer Size, to balance the latency estimation and collection stability of the echo cancellation unit, and the specific value of the first buffer coefficient is not defined herein.

Optionally, in some embodiments of the present disclosure, the second buffer 307 as a buffer space in a storage medium of the terminal device may be a buffer medium specifically used for echo cancellation, and may also be a buffer space reserved in the buffer medium, which is not specifically defined in the embodiment of the present disclosure.

Optionally; considering that the audio card playing unit (playback circuitry) generates a lag phenomenon more easily while playing the third voice signal than collecting the third voice signal, when the collected third voice signal is buffered, the buffer size (namely, the buffer size of the third voice signal) of the second buffer 307 needs to be dynamically adjusted by referring to the minimum buffer size of the audio card playing unit. For example, the buffer size of the third voice signal can be obtained according to the minimum buffer size of the audio card playing unit and the second buffer coefficient. For instance, the second buffer coefficient may be defined as 2, that is, the buffer size of the second buffer is set to be 2 times of Play Min Buffer Size, to relieve the problem of reference signal jittering caused by lag of the audio card playing unit, and the specific value of the second buffer coefficient is not defined herein.

Optionally, in some embodiments of the present disclosure, in certain scenarios, for example, the phenomena of poor network state and stagnation of the sending terminal, the terminal device cannot receive a data packet of the sending terminal, on one hand, the phenomenon that the voice signal buffered in the first buffer 302 is emptied may occur, which causes that the echo cancellation unit 305 has fluctuation while estimating the echo path and cannot continue the echo cancellation operation (for example, failing to match the reference signal from the reference signal queue). On the other hand, because the second buffer 307 buffers the data packet sent by the sending terminal all the time, while the second timing-driven unit 309 and the decoding unit 310 generate the reference signal periodically, the reference signal queue may be lengthened, especially, in the condition that the echo cancellation unit 304 cannot perform the echo cancellation operation, the length of the reference signal queue is more unstable. Therefore, in order to ensure the working stability of the audio card (including the audio card recording unit and the audio card playing unit) and ensure the stability of the length of the reference signal queue, collecting-playing related latency fluctuation can be reduced and echo path estimation of the echo cancellation unit 305 can be stabilized by filling the audio card and the reference signal queue with temporary data. For example, if there is no usable voice signal in the first buffer 302 in the timing period of the first timer, the first timing-driven unit 304 respectively fills the audio card playing unit and the reference signal queue with the temporary data, the temporary data being a sequence comprising 0.

The forgoing describes the terminal device in the embodiment of the present disclosure from the view of a unitized functional entity, and the following will describe a terminal device 40 in the embodiment of the present disclosure separately from the view of hardware processing.

Figure 5:
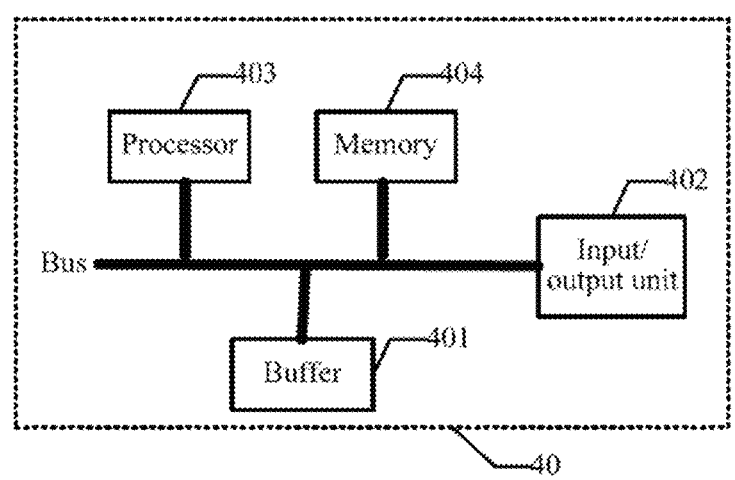
FIG. 5 is further another schematic structural diagram of the terminal in the present embodiment.

As shown in FIG. 5, the terminal device 40 in the embodiment of the present disclosure is applied to the echo cancellation method, the terminal device 40 comprising:
 a buffer 401, an input/output unit 402, a processor 403 and a memory 404 (the number of the processor 403 may be one or more, and in FIG. 5, one processor 403 is taken as an example).

In some embodiments of the present disclosure, the buffer 401, the input/output unit 402, the processor 403 and the memory 404 may be connected by a bus or other manners, and in FIG. 5, connection by a bus is taken as an example.

A server in the embodiment of the present disclosure may have more or less components than that shown in FIG. 5, may combine two or more parts, or may have different part configurations or settings, and each component can be implemented by hardware, software or combination of hardware and software involving one or more signal processing and/or application-specific integrated circuits.

By calling an operation instruction stored in the memory 404, the processor 403 is configured to execute the following steps:
 Buffering, by the buffer 401, the collected first voice signal;
 Obtaining, by the input, output unit 402, the buffered first voice signal and obtaining the reference signal matching the first voice signal from the reference signal queue in the first timing period, so that the estimated latency value between the first voice signal and the reference signal remains in a preset range; and
 performing echo cancellation processing on the echo signal in the first voice signal by using the reference signal to obtain a second voice signal, and outputting, by the input/out unit 402, the second voice signal.

Optionally, the processor 403 is also configured to execute the following steps before collecting the first voice signal;
 buffering, by the buffer 401, the received third voice signal, the first voice signal at least comprising a signal the same as the third voice signal;
 obtaining, by the input/output unit 402, the buffered third voice signal in the second timing period, the second riming period being before the first timing period; and
 decoding the obtained third voice signal to generate the reference signal, and adding the reference signal generated by decoding to the reference signal queue.

Optionally, the first timing period or the second timing period is obtained based on the frame length that is selected by the audio encoder in the terminal device for encoding.

Optionally, the buffer size of the first voice signal is obtained based on the minimum buffer size of the recoding unit of the audio card in the terminal device and the first buffer coefficient.

Optionally, the buffer size of the third voice signal is obtained based on the minimum buffer size of the playing unit of the audio card in the terminal device and the second buffer coefficient.

Optionally, by calling the operation instruction stored in the memory 404, the processor 403 is also configured to execute the following steps:
 respectively filling the playing unit of the audio card and the reference signal queue with the temporary data if there is no usable voice signal in the buffer in the first timing period, the temporary data being a sequence comprising 0.

In the abovementioned embodiments, description for each embodiment has respective special emphasis, and non-detailed parts of a certain embodiment can refer to related description of other embodiments.

In an application scenario of the embodiment of the present disclosure, because loss exists during sound propagation, problems such as noise interference exist, application needing assistance of the voice function, such as voice identifying, voice communication and recording may be influenced, and therefore, the processing effect of voice tone replay or precise identifying needs to be improved. The abovementioned processing effect can be improved by an echo latency detection technology. Specifically, the echo latency detection technology is a preprocessing link in the acoustic echo cancellation algorithm, and before echo cancellation processing, the time difference, namely echo latency, between the reference signal (a signal played by a loudspeaker) and the collected echo signal or the collected signal (a signal collected by a microphone) is calculated first, to facilitate the subsequent self-adaptive filtering echo cancellation and nonlinear echo suppression processing based on the echo latency. However, when the method for calculating the echo latency is the processing of the signal of the current frame, the overall sound variation state cannot be comprehensively estimated by adopting the current frame of signal, resulting in low calculation precision.

The embodiment of the present disclosure provides an echo cancellation solution, and by processing multiple frames of signals and extracting multiple signal characteristic values, cross-correlation operation of the extracted characteristic values is performed to obtain cross-correlation parameters, and then echo cancellation processing is performed based on the cross-correlation parameters. The echo cancellation solution can be implemented by adopting the following intelligent terminal.

The intelligent terminal (such as a mobile terminal) of the embodiment of the present disclosure can be implemented in various forms. For example, the mobile terminal described in the embodiment of the present disclosure may comprises mobile terminals such as a mobile phone, a smart phone, a notebook computer, a digital broadcasting receiver, a personal digital assistant (PDA), a tablet computer (PAD), a portable media player (PMP) and a navigation apparatus and fixed terminals such as a digital TV and a desk computer. In the following, it is assumed that the terminal is a mobile terminal. However, a person skilled in the art may understand that besides elements specifically configured for the objective of moving, structures based on the implementation manner of the present disclosure can also be applied to a terminal of a fixed type.

Figure 6:
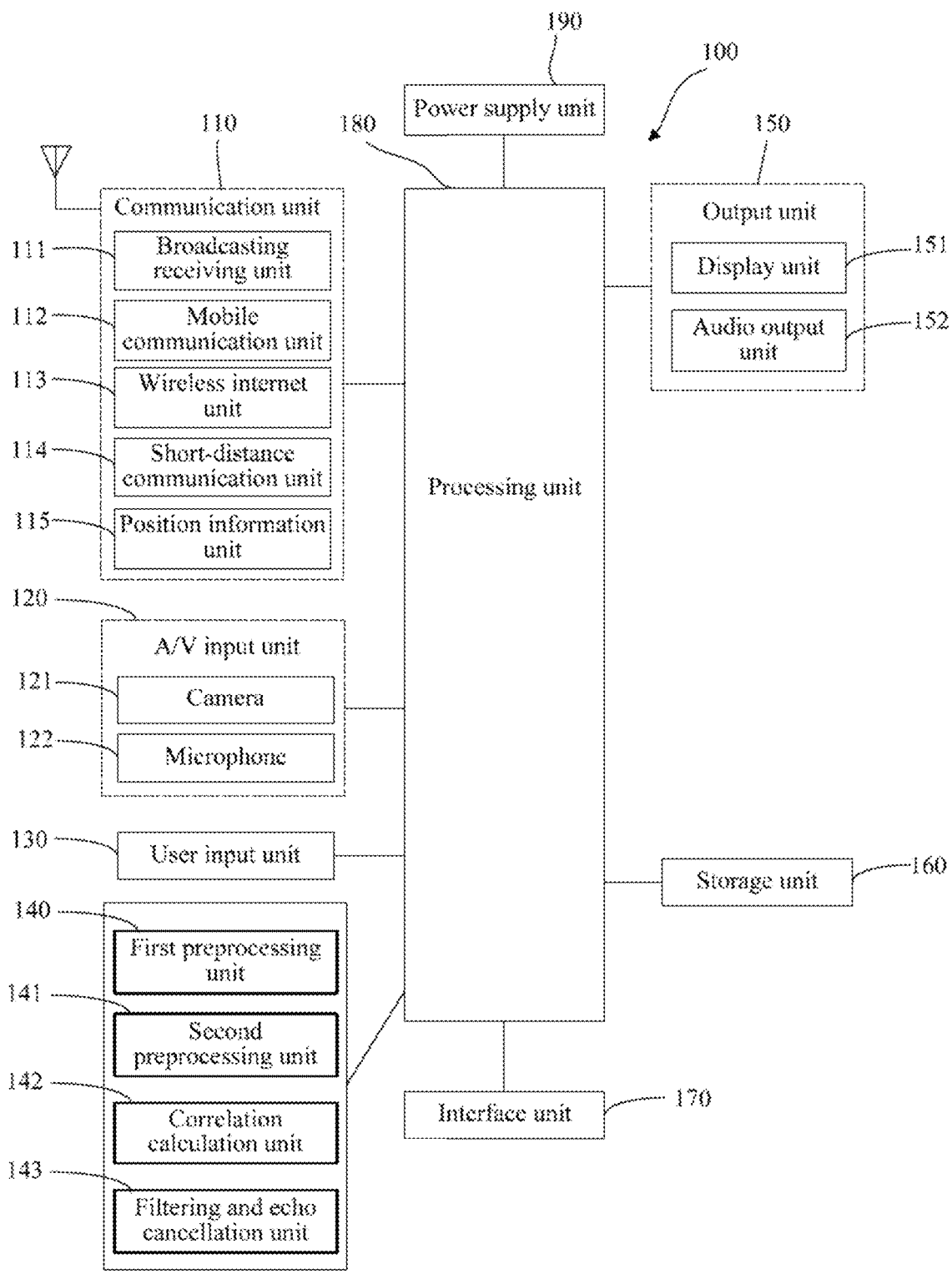
FIG. 6 is an optional hardware schematic structural diagram of a mobile terminal implementing all embodiments of the present disclosure.

FIG. 6 is an optional hardware schematic structural diagram of a mobile terminal implementing all embodiments of the present disclosure.

The mobile terminal 100 may comprise a communication unit 110, an audio/video (A/V) input unit 120, a user input unit 130, a first preprocessing unit 140, a second preprocessing unit 141, a correlation calculation unit 142, a filtering and echo cancellation unit 143, an output unit 150, a display unit 151, a storage unit 160, an interface unit 170, a processing unit 180 and a power supply unit 190. Each of these units may be controlled or implemented by processing circuitry. FIG. 6 shows the mobile terminal with various components, and it should be understood that not all the shown components are required to be implemented. More or fewer components may be implemented in a substitutable manner. Elements of the mobile terminal will be described in details in the following.

The communication unit 110 usually comprises one or more components, which allow radio communication between the mobile terminal 100 and a wireless communication system or network (if the mobile terminal is substituted by the fixed terminal, telecommunication may also be performed in a wired way). For example, when being a wireless communication unit specifically, the communication unit may comprise at least one of a broadcasting receiving unit 111, a mobile communication unit 112, a wireless internet unit 113, a short-distance communication unit 114 and a position information unit 115, and these units are optional, and can be added or deleted according to different requirements.

The broadcasting receiving unit 111 receives a broadcasting signal and/or broadcasting related information from an external broadcasting management server via a broadcasting channel. The broadcasting channel may comprise a satellite channel and/or a ground channel. The broadcasting management server may be a server for generating and sending a broadcasting signal and/or broadcasting related information or a server for receiving the broadcasting signal and/or the broadcasting related information generated earlier and sending the broadcasting signal and/or the broadcasting related information to the terminal. The broadcasting signal may be a TV broadcasting signal, a radio broadcasting signal, a data broadcasting signal and the like. Furthermore, the broadcasting signal may further comprise a broadcasting signal combined with TV or radio broadcasting signals. The broadcasting related information may be provided by a mobile communication network, and in such situation, the broadcasting related information may be received by the mobile communication unit 112. The broadcasting signal can exist in various forms, for example, it may exist in the forms of an electronic program guide (EPG) of a digital multimedia broadcasting (DMB), and an electronic service guide (ESG) of a digital video broadcasting-handheld (DVB-H), etc. The broadcasting receiving unit 111 may receive signal broadcasting by using various types of broadcasting systems. Particularly, the broadcasting receiving unit 111 may receive digital broadcasting by using digital broadcasting systems such as digital multimedia broadcasting-terrestrial (DMB-T), digital multimedia broadcasting-satellite (DMB-S), DVB-H and a data broadcasting system of a medium forward link only (media FLO) and integrated services digital broadcasting-terrestrial (ISDB-T), etc. The broadcasting receiving unit 111 can be configured to be various broadcasting systems and the abovementioned digital broadcasting systems suitable for providing broadcasting signals. A broadcasting signal and/or broadcasting related information received by the broadcasting receiving unit 111 may be stored in the memory 160 (or storage media of other types).

The mobile communication unit 112 sends a radio signal to at least one of a base station (such as an access point, a node B, etc.), an external terminal and a server and or receives a radio signal therefrom. Such radio signal may comprise voice communication signals, video communication signals, or various types of data sent and/or received according to the present disclosure and/or multimedia message.

The wireless internet unit 113 supports access of wireless internet of the mobile terminal. The unit can be internally or externally coupled to the terminal. The wireless internet access technology related by the unit may comprise wireless local area networks (Wi-Fi, WLAN), Wibro, Wimax, and high speed downlink packet access (HSDPA), etc.

The short-distance communication unit 114 is a unit supporting short-distance communication. Examples of the short-distance communication technology comprise Bluetooth, radio frequency identification (RFID), infrared data association (IrDA), ultra wideband (UWB), zigbee, etc.

The position information unit 115 is a unit configured to check or obtain the position information of the mobile terminal. A typical example of the position information unit is the global positioning system (GPS). According to the related art, the GPS unit 115 calculates distance information and accurate time information corning from three or more satellites and applies a triangulation method to the calculated information, to precisely calculate current three-dimensional position information according to longitude, latitude and height. Currently, three satellites are used by a method for calculating position and time information, and another satellite is used for correcting error of the calculated position and time information. In addition, the GPS unit 15 can calculate speed information by continuously calculating, in real time, the current position information.

The A/V input unit 120 is configured to receive an audio or video signal. The A/V input unit 120 may comprise a camera 121 and a microphone 122, and the camera 121 processes image data of a static picture or a video obtained by an image capturing device in a video capturing or image capturing mode. Processed image frame can be displayed on the display unit 151. The image frame processed by the camera 121 may be stored in the storage unit 160 (or other storage media) or sent by the communication unit 110, and two or more cameras 121 can be provided according to the structure of the mobile terminal. The microphone 122 can receive sound (audio data) in operation modes of a telephone communication mode, a recording mode, a voice identifying mode and the like, and can process such sound into audio data. The processed audio (voice) data can be converted to be output in a format that can sent to the mobile communication base station by the mobile communication unit 112 under the condition of the telephones communication mode. The microphone 122 can implement various types of noise cancellation (or suppression) algorithms to cancel (or suppress) noise or interference produced in the process of receiving and sending audio signals.

The user input unit 130 can generate key input data according to a command input by a user to control various operations of the mobile terminal. The user input unit 130 allows a user to input various types of information and may comprise a keyboard, a mouse, a touchpad (for example, a touch sensitive component for detecting variation of resistance, pressure, capacitance and the like caused by contact), a roller, a rocker and the like. Particularly, a touch screen can be formed when the touchpad is overlapped on the display unit 151 in a laminated manner.

A voice playing unit may also be referred to as an audio output unit, as shown in FIG. 6, the audio output unit 152 may specifically be a loudspeaker, which is configured to play a voice signal, the voice signal is propagated as a reference signal, and the reference signal is multiple frames of first signals; the voice acquisition unit, as shown in FIG. 6, may be specifically implemented as the microphone 122, and is configured to collect the echo signal, and the echo signal is obtained after the reference signal undergoes attenuation and/or noise interference in the propagation process and is multiple frames of second signals. As shown in FIG. 6, the first preprocessing unit 140 is configured to preprocess the multiple frames of first signals to obtain the characteristic values of the multiple frames of first signals; the second preprocessing unit 141 is configured to preprocess the multiple frames of second signals to obtain the characteristic values of the multiple frames of second signals; the correlation calculation unit 142 is configured to perform cross-correlation operation on the characteristic values of the multiple frames of first signals and the multiple frames of second signals to obtain cross-correlation parameters; and the filtering and echo cancellation unit 143 is configured to perform tracking filtering operation based on the cross-correlation parameters to obtain a filtering result, obtain an echo latency value based on the filtering result and perform echo cancellation in a call by using the echo latency value.

The interface unit 170 is used as an interface through which at least one external apparatus can be connected with the mobile terminal 100. For example, the external apparatus may comprise a wired or wireless headphone port, an external power supply (or battery charger) port, a wired or wireless data port, a memory card port, a port for connecting an apparatus with an identifying unit, an audio input/output (I/O) port, a video I/O port, a earphone port and the like. The identifying unit may be configured to store various information used for verifying use, by the user, of the mobile terminal 100 and may comprise a user identify module (UIM), a subscriber identity module (SIM), a universal subscriber identity module (USIM), etc. In addition, an apparatus with, the identifying unit (referred to as an identifying apparatus beneath) may adopt the form of an intelligent card, and therefore, the identifying apparatus may be connected with the mobile terminal 100 via a port or other connecting apparatuses. The interface unit 170 may be configured to receive input (for example, data information, electric power, etc.) from the external apparatus and transmit the received input to one or more elements in the mobile terminal 100 or may be configured to transmit data between the mobile terminal and the external apparatus.

In addition, when the mobile terminal 100 is connected with an external base, the interface unit 170 may be configured as a path allowing electric power to be provided to the mobile terminal 100 from the base or may be configured as a path allowing various command signals input from the base to be transmitted to the mobile terminal. Various command signals or electric power input from the base may be used as signals for identifying whether the mobile terminal is precisely mounted on the base. The output unit 150 is constructed to provide output signals (such as an audio signal, a video signal and a vibration signal) in a visual, audio and/or touch manner. The output unit. 150 may comprise the display unit 151, the audio output unit 152, etc.

The display unit 151 can display information processed in the mobile terminal 100. For example, the mobile terminal 100 may display related user interface (UI) or graphical user interface (GUI). When the mobile terminal 100 is in a video call mode or image capturing mode, the display unit 151 may display a captured image and/or received image, and show UI or GUI, etc. of video or image and related functions.

Meanwhile, when the display unit 151 and the touchpad are mutually overlapped in a laminated manner to form a touch screen, the display unit 151 may be configured as an input apparatus and an output apparatus. The display unit 151 may comprise at least one of a liquid crystal display (LCD), a thin film transistor-LCD (TFT-LCD), an organic light-emitting diode (OLED) display, a flexible display, and a three-dimensional (3D) display, etc. Some of these displays may be constructed to be transparent to allow the user to watch from the outside, which can be referred to as transparent displays, and a typical display may be, for example, a transparent organic light-emitting diode (TOLED) display, etc. According to a specific desired implementing manner, the mobile terminal 100 may comprise two or more display units (or other display apparatus), for example, the mobile terminal may comprises an external display unit (not shown) and an internal display unit (not shown). The touch screen may be configured to detect touch input pressure and touch input position and touch input area.

The audio output unit 152 can convert audio data received by the communication unit 110 or stored in the memory 160 into an audio signal and output as a sound when the mobile terminal is in the modes of a calling signal receiving mode, a call mode, a recording mode, a voice identifying mode, a broadcasting receiving mode, etc. Moreover, the audio output unit 152 may provide audio output (for example, calling signal receiving sound, message receiving sound, etc.)

related to specific functions executed by the mobile terminal 100. The audio output unit 152 may comprise a loudspeaker, a buzzer and the like.

The storage unit 160 may store software programs of processing and control operations executed by the processing unit 180, and the like, or may temporarily store data which are already output or to be output (such as a telephone directory, a message, a static image, a video, etc.). Furthermore, the storage unit 160 may store data related to vibration and audio signals of various manners when touch is applied to the touch screen.

The storage unit 160 may comprise at least one type of storage medium, and the storage medium comprises a flash memory, a hard disk, a multimedia card, a card type memory (such as SD or DX memory, etc.), a random access memory (RAM), a static random access memory (SRAM), a read only memory (ROM), an electrically erasable programmable read only memory (EEPROM), a programmable read only memory (PROM), a magnetic memory, a disc, an optical disc, etc. Moreover, the mobile terminal 100 may cooperate with a network storage apparatus executing, by connection with a network, the storage function of the storage unit 160.

The processing unit 180 usually controls the general operation of the mobile terminal. For example, the processing unit 180 executes control and processing related to voice call, data communication, video call and the like. For another example, the processing unit 180 may execute mode identify processing, to identify hand input or picture drawing input executed on the touch screen as a character or an image.

The power supply unit 190 receives external electric power or internal electric power under the control of the processing unit 180 and provides appropriate electric power required by operating various elements and components.

Various implementation manners described here may be implemented by using a non-transitory computer readable medium such as computer software, hardware or any combination of software and hardware. For implementation of hardware, the implementation manner described here may be implemented by using at least one of an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, and electronic units designed to execute the function described here, and in some cases, such implementation manner may be implemented in the controller 180. For implementation of software, such as the implementation manner of a process or a function may be implemented by an independent software unit allowing executing of at least one function or operation. Software code may be implemented by a software application program (or process) edited by any appropriate programming language, and the software code may be stored in the memory 160 and executed by the controller 180.

So far, the mobile terminal has been described according to functions thereof. In the following, for the sake of clarity, sliding type mobile terminals in various types of mobile terminals, such as folding type, straight panel type, swing type and sliding type mobile terminals will be described. Therefore, the present disclosure can be applied to mobile terminals of any type, and is not limited to the sliding type mobile terminal.

The mobile terminal 100 shown in FIG. 6 may be constructed to be operated by, for example, wired and wireless communication systems and a communication system based on satellite, which send data via frame or packet.

Now, a communication system which can be operated based on the mobile terminal in the embodiment of the present disclosure will be described by referring to FIG. 7.

Different air interfaces and/or physical layers may be used for such communication system. For example, an air interface used by the communication system comprises, for example, frequency division multiple access (FDMA), time division multiple access (TDMA), code division multiple access (CDMA) and universal mobile telecommunications system (UMTS) (particularly, long term evolution (LTE)), and GSM, etc. As a non-limiting example, the following descriptions relate to a CDMA communication system, but such teaching is also applicable to other types of systems.

Figure 7:
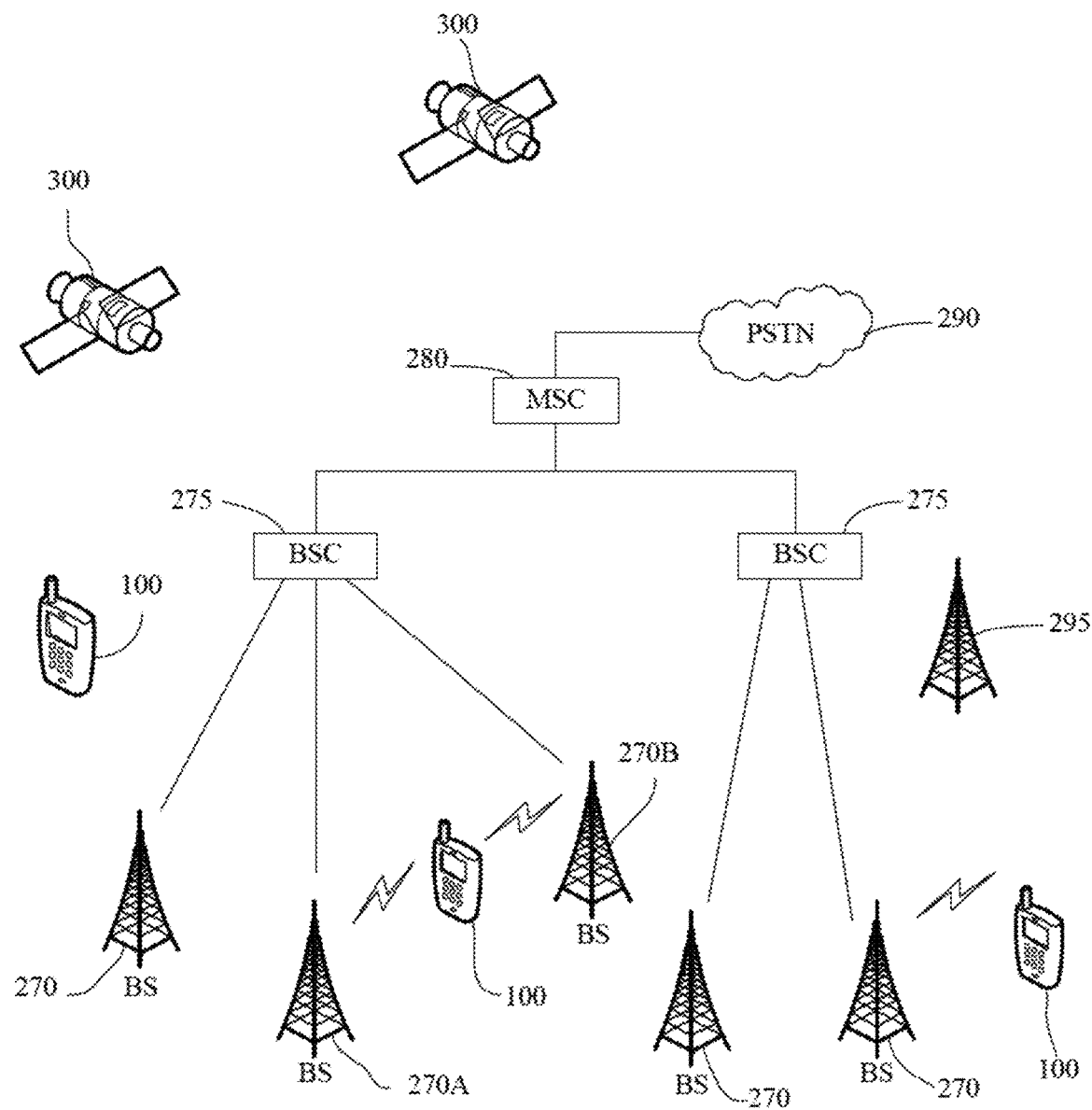
FIG. 7 is a communication system schematic diagram of the mobile terminal as shown in FIG. 6.

Referring to FIG. 7, the CDMA wireless communication system may comprise multiple mobile terminals 100, multiple base stations (BSs) 270, a base station controller (BC) 275 and a mobile switching center (MSG) 280. The MSC280 is constructed to form an interface with a public switched telephone network (PSTN) 290. The MSC280 is also constructed to form an interface with BSC275 that can coupled to the base station via a backhaul circuit. The backhaul circuit may be constructed based on any one of known interfaces, and the interface comprises, for example, E1/T1, ATM, IP, PPP, frame relay, HDSL, ADSL or xDSL. It should be understood that, the system shown in FIG. 7 may comprise multiple BSCs 275.

Each BS 270 may serve one or multiple partitions (or areas), and all partitions covered by a multi-directional antenna or an antenna pointing to a specific direction keep away from BS 279 radially. Or, each partition may be covered by two or more antenna used for diversity reception. Each BS 270 may be constructed to support allocation of multiple frequencies, and allocation of each frequency has a specific spectrum (for example, 1.25 MHz, 5 MHz, etc.).

Intersection of the partition and the frequency allocation may be referred to as CDMA channel. BS 270 may also be referred to as a base transceiver station (BTS) or other equivalent terms. In such condition, the term "base station" may be used for generally representing a single BSC275 or at least one BS 270. The base station may also be referred to as "cellular station". Or each partition of a specific BS270 may be referred to as multiple cellular stations.

As shown in FIG. 7, a broadcast transmitter 295 sends a broadcasting signal to the mobile terminals 100 operated in the system. The broadcasting receiving unit 111 as shown in FIG. 6 is set at the mobile terminal 100 to receive the broadcasting signal sent by the BT295. FIG. 7 shows several satellites 300, for example, a GPS satellite 300 may be adopted. The satellite 300 helps to position at least one of the multiple mobile terminals 100.

FIG. 7 describes multiple satellites 300, but if should be understood that, usable positioning information may be obtained by utilizing airy quantity of satellites. The position information unit 115 as shown in FIG. 6 is usually constructed to match with the satellites 300 to obtain required positioning information. Instead of or in addition to the GPS tracking technology, other technologies capable of tracking the position of the mobile terminals may be used. In addition, at least one GPS satellite 300 may selectively or additionally process satellite DMB transmission.

As a typical operation of the wireless communication system, BS 270 receives reverse link signals coming from various mobile terminals 100. The mobile terminals 100 usually participate in calling, message transceiving and communication of other types Each reverse link signal received by the specific base station 270 is processed in the specific BS270. The obtained data is forwarded to related BSC 275. BSC provides a call resource allocation function and a mobile management function including coordination of a soft handover process between BS270. BSC 275 also routes the received data to MSC 280, which provides an extra routing service used for forming an interface with PSTN290. Similarly, PSTN290 forms an interface with MSC280, MSC forms an interface with BSC275, and BSC275 correspondingly controls BS270 to send forward link signals to the mobile terminals 100.

The mobile communication unit 112 of the communication unit 110 in the mobile terminal accesses to a mobile communication network based on data (including user identify information and authentication information) that is necessary for accessing the mobile communication network (such as 2G/3G/4G mobile communication network) and built in the mobile terminal to transmit mobile communication data (including uplink mobile communication data and downlink mobile communication data) for services of wed browsing, network multimedia playing, and the like of the users of the mobile terminal.

The wireless internet unit 113 of the communication unit 110 implements the function of wireless hotspot by operating the function of related protocol of the wireless hotspot, and the wireless hotspot supports access of multiple mobile terminals (any mobile terminal except the mobile terminal), and transmits mobile communication data (including uplink mobile communication data and downlink mobile communication data) for services of wed browsing, network multimedia playing, and the like of the users of the mobile terminal by reusing mobile communication connection between the mobile communication unit 112 and the mobile communication network; due to the fact that the mobile terminal transmits the mobile communication data by reusing the mobile communication connection between the mobile terminal and the communication network, the traffic of the mobile communication data consumed by the mobile terminal is counted into the communication tariff of the mobile terminal by a billing entity at the communication network side, to consume data traffic of mobile communication data included in the communication tariff signed by the mobile terminal in use.

By adopting the embodiment of the present disclosure, the processing logic 10 may be executed by the terminal device, that is, the terminal device performs specific processing logic such as cross-correlation operation on multiple frames of reference signals and multiple frames of echo signals, and the processing logic 10 may also be executed by a server, that is, multiple frames of reference signals played by the terminal and multiple frames of echo signals collected by the terminal are reported to the server, and the server performs specific processing logic such as cross-correlation operation on the multiple frames of reference signals and the multiple frames of echo signals. The processing logic 10 comprises: S1, propagating a voice signal played by the voice playing unit as a reference signal, the reference signal being multiple frames of first signals; S2, collecting echo signals propagated back to the voice collection unit, the echo signals being signals obtained after the reference signal undergoes attenuation and/or noise interference in the propagation process, and the echo signals being multiple frames of second signals; S3, preprocessing the multiple frames of first signals to obtain multiple frames of third signals; S4, preprocessing the multiple frames of second signals to obtain multiple frames of fourth signals; S5, performing cross-correlation operation on the multiple frames of third signals and the multiple frames of fourth signals to obtain cross-correlation parameters; and S6, performing tracking filtering operation based on the cross-correlation parameters to obtain a filtering result, taking the filtering result as an echo latency value, and performing echo cancellation in call by using the echo latency value.

It should be noticed that in processing logic executed by the server, the processing may be performed aiming at the multiple frames of reference signals and the multiple frames of collection signals repeated by the terminal, and the processing may also be performed aiming at a characteristic result after characteristic extraction of the multiple frames of reference signals and a characteristic result after characteristic extraction of the multiple frames of collection signals.

Figure 8:
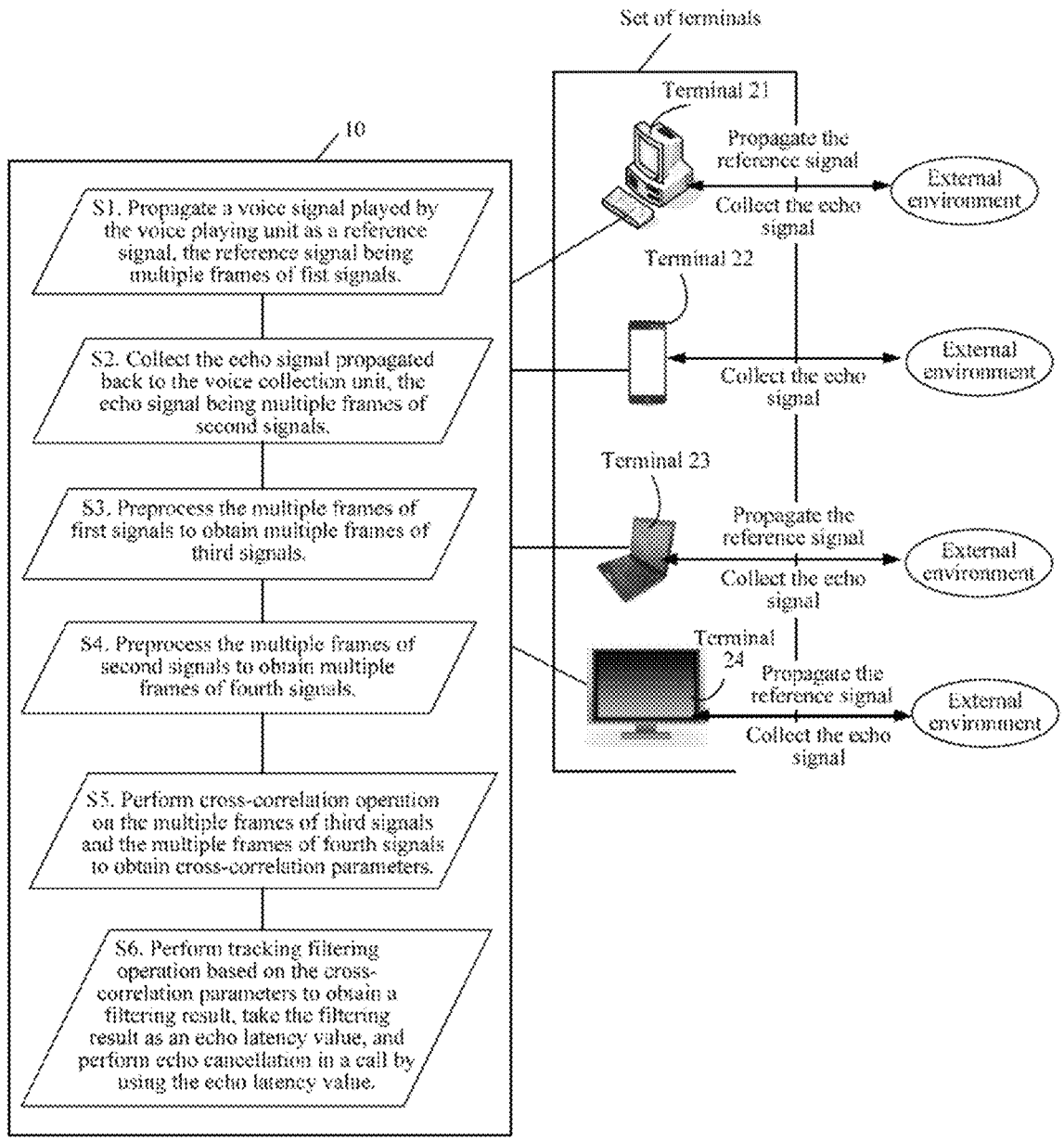
FIG. 8 is a schematic diagram of the terminals in executing processing logic in the embodiment of the present disclosure.
Figure 9:
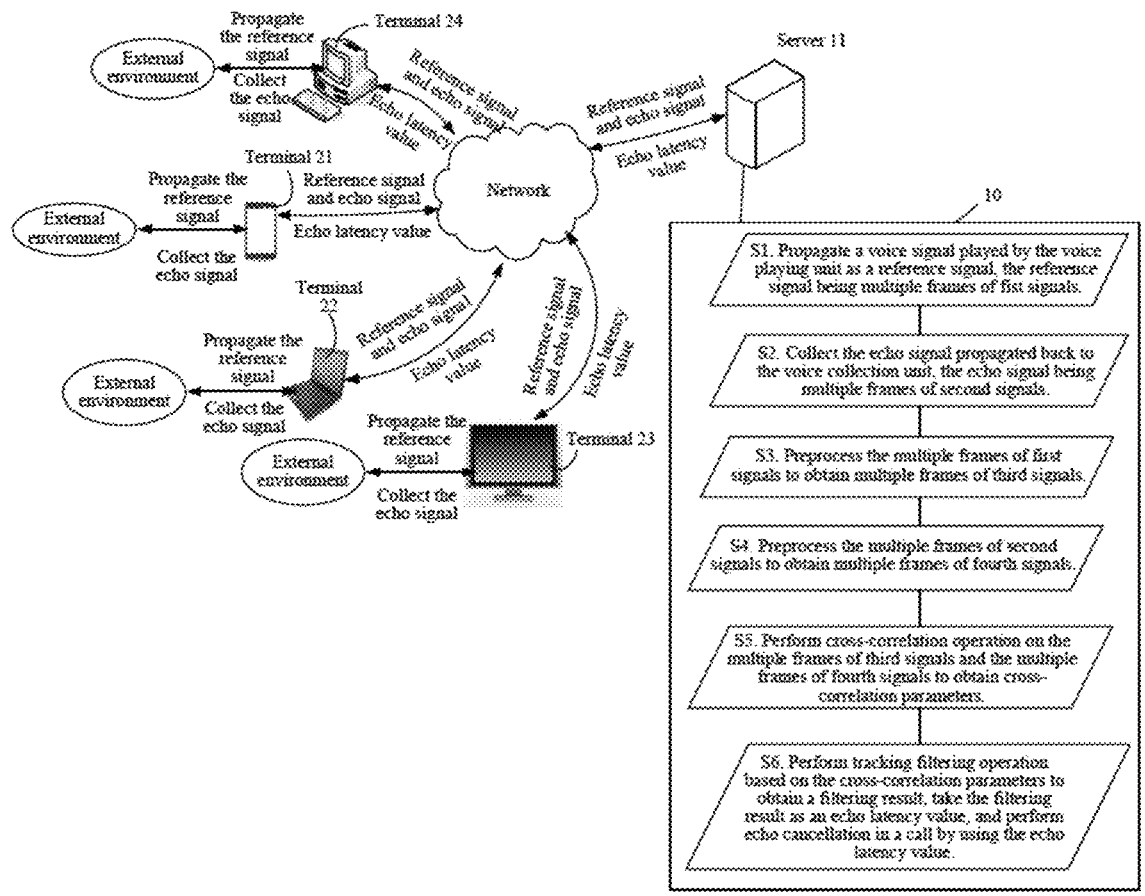
FIG. 9 is a schematic diagram of all hardware entities performing interaction with the terminals in the process of executing processing logic by a server.

FIG. 8 is a schematic diagram of the terminals in executing specific processing logic such as cross-correlation operation on the multiple frames of reference signals and the multiple frames of echo signals, in FIG. 8, terminal devices 21-24 are involved, and any terminal device can execute the specific processing logic. FIG. 9 is a schematic diagram of a server in executing the specific processing logic, such as cross-correlation operation, and relates to hardware entities of all parties for information interaction. In FIG. 9, terminal devices 21-24 and a server 11 are involved, the terminal devices 21-24 perform informant interaction with the server by a wired network or a wireless network, and the terminal devices comprise mobile phones, desktop computers, PC, all-in-one machine, and other types.

By adopting the embodiment of the present disclosure, the reference signal and the echo signal are both multiple frames of signals, after the two are preprocessed, cross-correlation operation is performed on the multiple frames of reference signals and the multiple frames of echo signals, and because the processing is performed on the multiple frames of signals with certain intervals, the overall sound variation state can be comprehensively estimated, to improve the calculation precision of the echo latency value. With increase of the calculation precision of the echo latency value, the accuracy for echo cancellation is increased, and the processing effect for voice functions such as voice identifying, voice call and recording will become better and better.

Examples of FIGS. 8-9 are only one of system structure examples implementing the embodiment of the present disclosure, and the embodiment of the present disclosure is not limited to the system structure described in FIG. 8. Each embodiment of the method of the present disclosure is provided based on the mobile terminal 100 hardware structure described in FIG. 6, the communication system described in FIG. 7 and the system structure described in FIG. 8.

Figure 10:
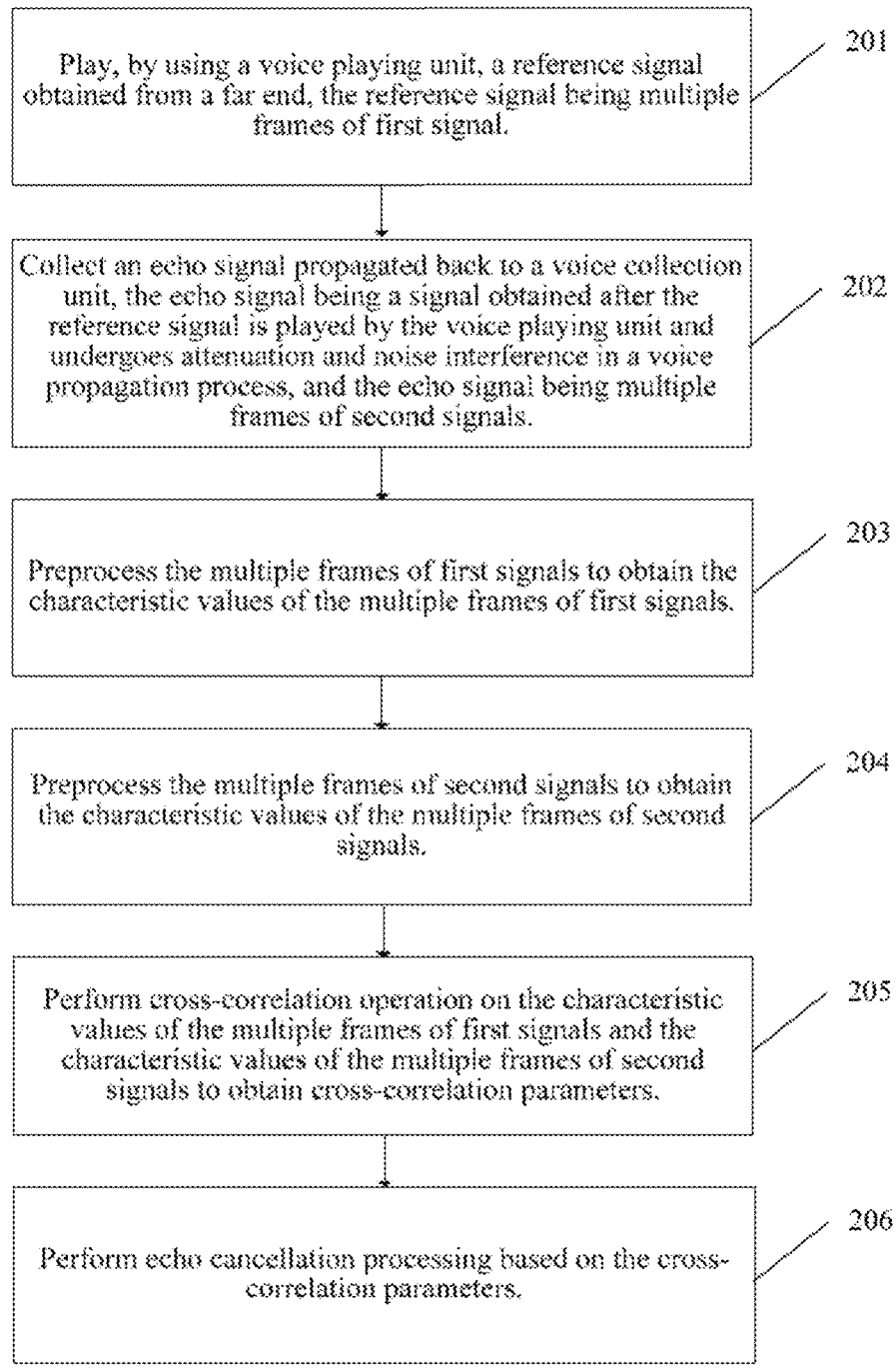
FIG. 10 is an implementing schematic flowchart of the embodiment of the present disclosure.

An information processing method of the embodiment of the present disclosure, as shown in FIG. 10, comprises:

Step 201: Play, by using a voice playing unit, a reference signal obtained from a far end, the reference signal being multiple frames of first signal.

Here, the voice playing unit may be a loudspeaker, one example is that a voice signal played by the loudspeaker is propagated as a reference signal, one voice phoneme may cover multiple frames of signals, and the spectrum characteristics of these multiple frames of signals are very similar, that is, the spectrum binarization data of neighboring multiple frames of signals may be similar, and the overall sound variation state cannot be comprehensively reflected if subsequent comparison is performed by only using one frame of signal, that is because only when characteristic extraction has some difference, a precise echo latency value may be more easily calculated for the final echo cancellation processing, and therefore, in the embodiment of the present disclosure, multiple frames of signals are selected as the reference signals for subsequent characteristic extraction, referred to as multiple frames of first signals and multiple frames of reference signals for short.

Step 202: Collect an echo signal propagated back to the voice collection unit, the echo signal being a signal obtained after the reference signal is played by the voice playing unit and undergoes attenuation and noise interference in a voice propagation process, and the echo signal being multiple frames of second signals.

Here, the voice collection unit may be a microphone, one example is that the echo signal is collected by the microphone, and the echo signal is a signal obtained after the reference signal undergoes attenuation and noise interference in a voice propagation process. For the microphone, the reference signal played by the loudspeaker may be referred to as a far-end signal, and the echo signal (or referred to as collection signal) collected by the microphone may be referred to as a near-end signal.

Here, the "echo signal" described in the present disclosure comprises all sound signals which can be collected by the voice collection unit, and is not limited to the echo signal, and the echo signal in the present disclosure may also be referred to as a collection signal.

One voice phoneme may cover multiple frames of signals, and the spectrum characteristics of these multiple frames of signals are very similar, that is, the spectrum binarization data of neighboring multiple frames of signals may be similar, and the overall sound variation state cannot be comprehensively reflected if subsequent comparison is performed by only using one frame of signal, that is because only when characteristic extraction has some difference, a precise echo latency value may be more easily calculated for the final echo cancellation processing, and therefore, in the embodiment of the present disclosure, multiple frames of signals are selected as the reference signals for subsequent characteristic extraction, referred to as multiple frames of first signals and multiple frames of reference signals for short.

Step 203: Preprocess the multiple frames of first signals to obtain the characteristic values of the multiple frames of first signals.

Here, the preprocessing process may also be referred to as a characteristic extraction process, and in the characteristic extraction process, the characteristic values of multiple frames of first signals (or referred to as multiple frames of reference signals) need to be obtained for subsequent cross-correlation operation.

Step 204: Preprocess the multiple frames of second signals to obtain the characteristic values of the multiple frames of second signals.

Here, the preprocessing process may also be referred to as a characteristic extraction process, and the in characteristic extraction process, the characteristic values of multiple frames of second signals (or referred to as multiple frames of echo signals) need to be obtained for subsequent cross-correlation operation.

Policies for performing characteristic extraction in step 203 and step 204 may be the same or different, and in the situation of the same policy, the only difference is the operation parameters.

Step 205: Perform cross-correlation operation on the characteristic values of the multiple frames of first signals and the characteristic values of the multiple frames of second signals to obtain cross-correlation parameters.

Here, one example of cross-correlation parameters obtained by performing cross-correlation operation is a cross-correlation function, and the correlation between the characteristic values extracted from the multiple frames of reference signals and the multiple frames of echo signals may be compared based on the cross-correlation function. The embodiment of the present disclosure is a solution of solving the echo latency value by adopting a method of multi-frame characteristic merging of a far end and a near end and calculating the cross-correlation function. The far end refers to a loudspeaker playing terminal, and the near end refers to a microphone collecting terminal. One example is that: the near end uses three frames of signals with intervals being respectively D1(D1=10) and D2(D2=20), and, of course, may also use more than three frames of signals, the interval value designed here may be constant in the whole echo latency tracking process, and the advantage is that: it can be compared with an empirical value subsequently, and because the empirical value is relevant to a fixed interval, if the interval is not fixed, the selection of the empirical value may nest be precise. Fixed interval is a static selecting manner, and may also be a dynamic selecting manner such as a non-fixed interval, which will cause greater difference, thus being more favorable for preventing the situation that signal comparison is too similar, and therefore, the calculation of the echo latency value is more accurate, but, the selection of the empirical value may increase the processing cost.

In the embodiment of the present disclosure, a link of multiple frames of binary data merging is newly increased, and Xor and Sum calculation is performed for the cross-correlation operation by virtue of the merging value of multiple frames (multiple frames of binarized data).

Step 206: Perform echo cancellation processing based on the cross-correlation parameters.

In practical application, tracking filtering operation may be performed based on the cross-correlation parameters to obtain a filtering result, an echo latency value is obtained based on the filtering result, and echo cancellation is performed in a call by using the echo latency value.

Here, by virtue of the abovementioned steps, precise echo latency detection is implemented before echo cancellation processing, and a target value that complies with the requirement of the empirical value is selected from the filtering result to be used as the echo latency value. In echo latency detection, time difference, namely echo latency, between the reference signal (a signal played by the loudspeaker) and an echo signal thereof is calculated first, to facilitate subsequent self-adaptive filtering echo cancellation and nonlinear echo suppression processing.

The embodiment of the present disclosure is a solution of solving the echo latency value by adopting a method of multi-frame characteristic merging of a far end and a near end and calculating the cross-correlation function, while in the related art, cross-correlation statistic is performed on one frame of signal of the near end and one frame of signal of the far end to obtain the echo latency value; because only one frame of signal is used for comparison for a far-end signal in the related art the phenomenon that the cross-correlation values of neighboring frames of multiple continuous frames are similar or even same values, and are too similar, may occur, and therefore, no difference can be found out, and the cross-correlation parameters obtained by such calculation is not favorable for subsequent echo cancellation. While by adopting the embodiment of the present disclosure, it is required to be not too similar, and therefore, processing of multiple frames of signals is adopted; because multiple frames of signals have intervals, difference exists, and the cross-correlation parameters obtained by such calculation can be better for subsequent echo cancellation.

Figure 11:
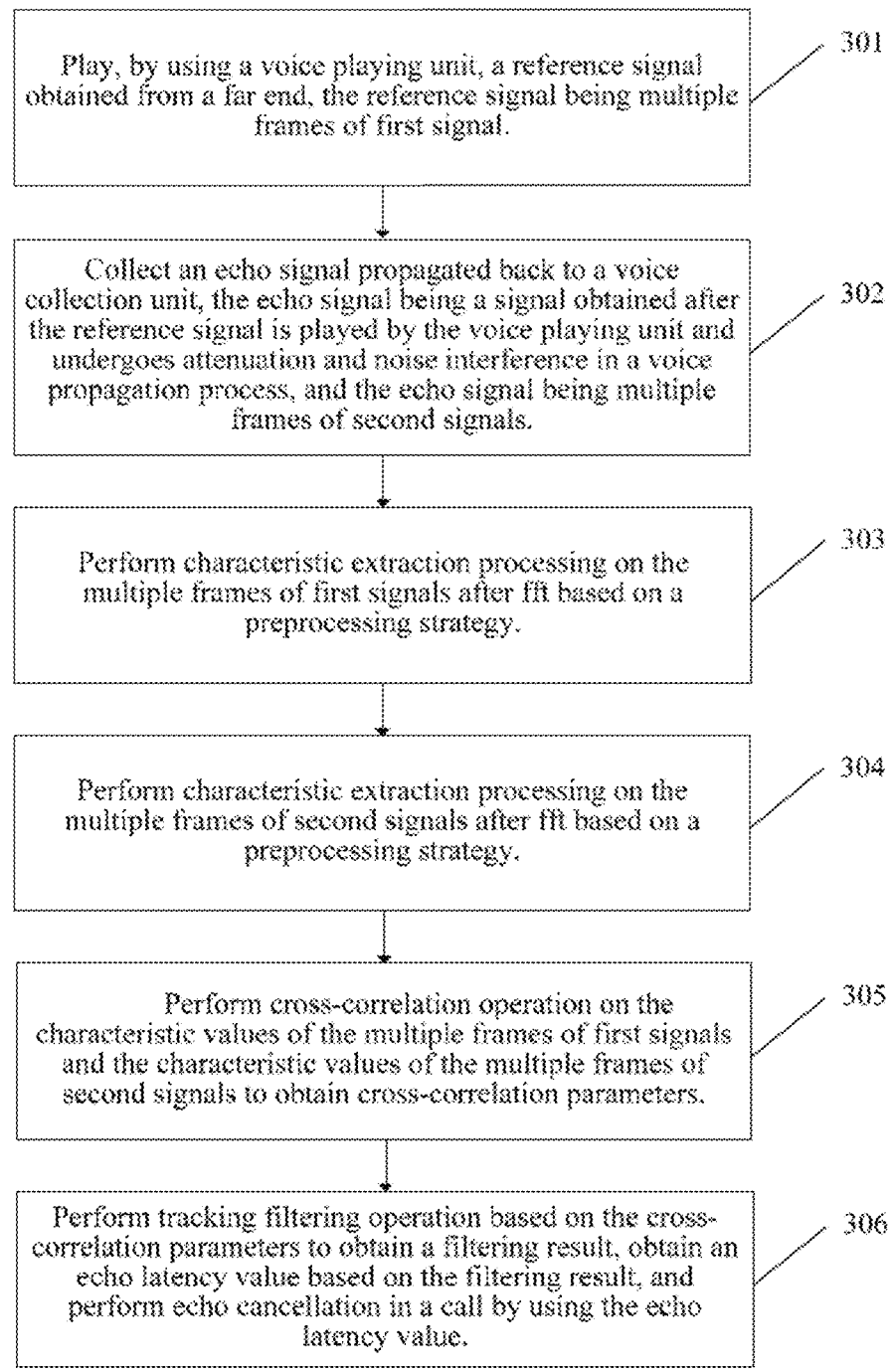
FIG. 11 is another implementing schematic flowchart of the embodiment of the present disclosure.

An information processing method of the embodiment of the present disclosure, as shown in FIG. 11, comprises:

Step 301: Play, by using a voice playing unit, a reference signal obtained from a far end, the reference signal being multiple frames of first signal.

Here, the voice playing unit may be a loudspeaker, one example is that a voice signal played by the loudspeaker is propagated as a reference signal, one voice phoneme may cover multiple frames of signals, and the spectrum characteristics of these multiple frames of signals are very similar, that is, the spectrum binarized data of neighboring multiple frames of signals may be similar, and the overall sound variation state cannot be comprehensively reflected if subsequent comparison is performed by only using one frame of signal, that is because only when characteristic extraction has some difference, a precise echo latency value may be more easily calculated for the final echo cancellation processing, and therefore, in the embodiment of the present disclosure, multiple frames of signals are selected as the reference signals for subsequent characteristic extraction, referred to as multiple frames of first signals and multiple frames of reference signals for short.

Step 302: Collect an echo signal propagated back to a voice collection unit the echo signal being a signal obtained after the reference signal is played by the voice playing unit and undergoes attenuation and/or noise interference in a voice propagation process, and the echo signal being multiple frames of second signals.

Here, the voice collection unit may be a microphone, one example is that the echo signal is collected by the microphone, and the echo signal is a signal obtained after the reference signal undergoes attenuation and/or noise interference in a voice propagation process. For the microphone, the reference signal played by the loudspeaker may be referred to as a far-end signal, and the echo signal (or referred to as collection signal) collected by the microphone may be referred to as a near-end signal.

One voice phoneme may cover multiple frames of signals, and the spectrum characteristics of these multiple frames of signals are very similar, that is, the spectrum binarized data of neighboring multiple frames of signals may be similar, and the overall sound variation state cannot be comprehensively reflected if subsequent comparison is performed by only using one frame of signal, that is because only when characteristic extraction has some difference, a precise echo latency value may be more easily calculated for the final echo cancellation processing, and therefore, in the embodiment of the present disclosure, multiple frames of signals are selected as the echo signals for subsequent characteristic extraction, referred to as multiple frames of second signals and multiple frames of echo signals for short.

Step 303: Perform characteristic extraction processing on the multiple frames of first signals after fft based on a preprocessing policy.

Here, the preprocessing process may also be referred to as a characteristic extraction process, and in the characteristic extraction process, the characteristic values of multiple frames of first signals (or referred to as multiple frames of reference signals) need to be obtained for subsequent cross-correlation operation.

In the characteristic extraction processing process of the step, obtaining a first fft parameter obtained by performing fft transformation on the multiple frames of first signals; obtaining a first sampling frequency value; obtaining a first power spectrum corresponding to each frame of first signal based on the first fft parameter, the first sampling frequency value and a first frequency point parameter value and extracting the first power spectrum; and obtaining a smoothed value of the first power spectrum based on the first power spectrum corresponding to each frame of first signal and extracting the smoothed value.

Step 304: Perform characteristic extraction processing on the multiple frames of second signals after fft based on a preprocessing policy.

Here, the preprocessing process may also be referred to as a characteristic extraction process, and in the characteristic extraction process, the characteristic values of multiple frames of second signals (or referred to as multiple frames of echo signals) need to be obtained for subsequent cross-correlation operation.

In the characteristic extraction processing process of the step, obtaining a second fft parameter obtained by performing fft transformation on the multiple frames of second signals; obtaining a second sampling frequency value; obtaining a second power spectrum corresponding to each frame of second signal based on the second fft parameter, the second sampling frequency value and a second frequency point parameter value and extracting the second power spectrum; and obtaining a smoothed value of the second power spectrum based on the second power spectrum corresponding to each frame of second signal and extracting the smoothed value.

Policies for performing characteristic extraction in step 303 and step 304 may be the same or different, and in the situation of the same policy, the only difference is the operation parameters.

Step 305: Perform cross-correlation operation on the characteristic values of the multiple frames of first signals and the characteristic values of the multiple frames of second signals to obtain cross-correlation parameters.

Here, one example of cross-correlation parameters obtained by performing cross-correlation operation is a cross-correlation function, and the correlation between the characteristic values extracted from the multiple frames of reference signals and the multiple frames of echo signals may be compared based on the cross-correlation function. The embodiment of the present disclosure is a solution of solving the echo latency value by adopting a method of multi-frame characteristic merging of a far end and a near end and calculating the cross-correlation function. The far end refers to a loudspeaker playing terminal, and the near end refers to a microphone collecting terminal. One example is that: the near end uses three frames of signals with intervals being respectively D1(D1=10) and D2(D2=20), and, of course, may also use more than three frames of signals, the interval value designed here may be constant in the whole echo latency tracking process, and the advantage is that: it can be compared with an empirical value subsequently, and because the empirical value is relevant to a fixed interval, if the interval is not fixed, the selection of the empirical value may not be precise. Fixed interval is a static selecting manner, and may also be a dynamic selecting manner such as a non-fixed interval, which will cause greater difference, thus being more favorable for preventing the situation that signal comparison is too similar, and therefore, the calculation of the echo latency value is more accurate, but, the selection of the empirical value may increase the processing cost.

In the embodiment of the present disclosure, a link of multiple frames of binary data merging is newly increased, and Xor and Sum calculation is performed for the cross-correlation operation by virtue of the merging value of multiple frames (multiple frames of binarized data).

Step 306: Perform tracking filtering operation on the cross-correlation parameters to obtain a filtering result, obtain an echo latency value based on the filtering result, and perform echo cancellation in a call by using the echo latency value.

Here, by virtue of the abovementioned steps, precise echo latency detection is implemented before echo cancellation processing, and a target value that complies with the requirement of the empirical value is selected from the filtering result to be used as the echo latency value. In echo latency detection, time difference, namely echo latency, between the reference signal (a signal played by the loudspeaker) and an echo signal thereof is calculated first, to facilitate subsequent self-adaptive filtering echo cancellation and nonlinear echo suppression processing.

The embodiment of the present disclosure is a solution of solving the echo latency value by adopting a method of multi-frame characteristic merging of a far end and a near end and calculating the cross-correlation function, while in the related art, cross-correlation statistic is performed on one frame of signal of the near end and one frame of signal of the far end to obtain the echo latency value; because only one frame of signal is used for comparison for a far-end signal in the related art, the phenomenon that the cross-correlation values of neighboring frames of multiple continuous frames are similar or even same values, and are too similar, may occur, and therefore, no difference can be found out, and the cross-correlation parameters obtained by such calculation is not favorable for subsequent echo cancellation. While by adopting the embodiment of the present disclosure, it is required to be not too similar, and therefore, processing of multiple frames of signals is adopted; because multiple frames of signals have intervals, difference exists, and the cross-correlation parameters obtained by such calculation can be better for subsequent echo cancellation.

Figure 12:
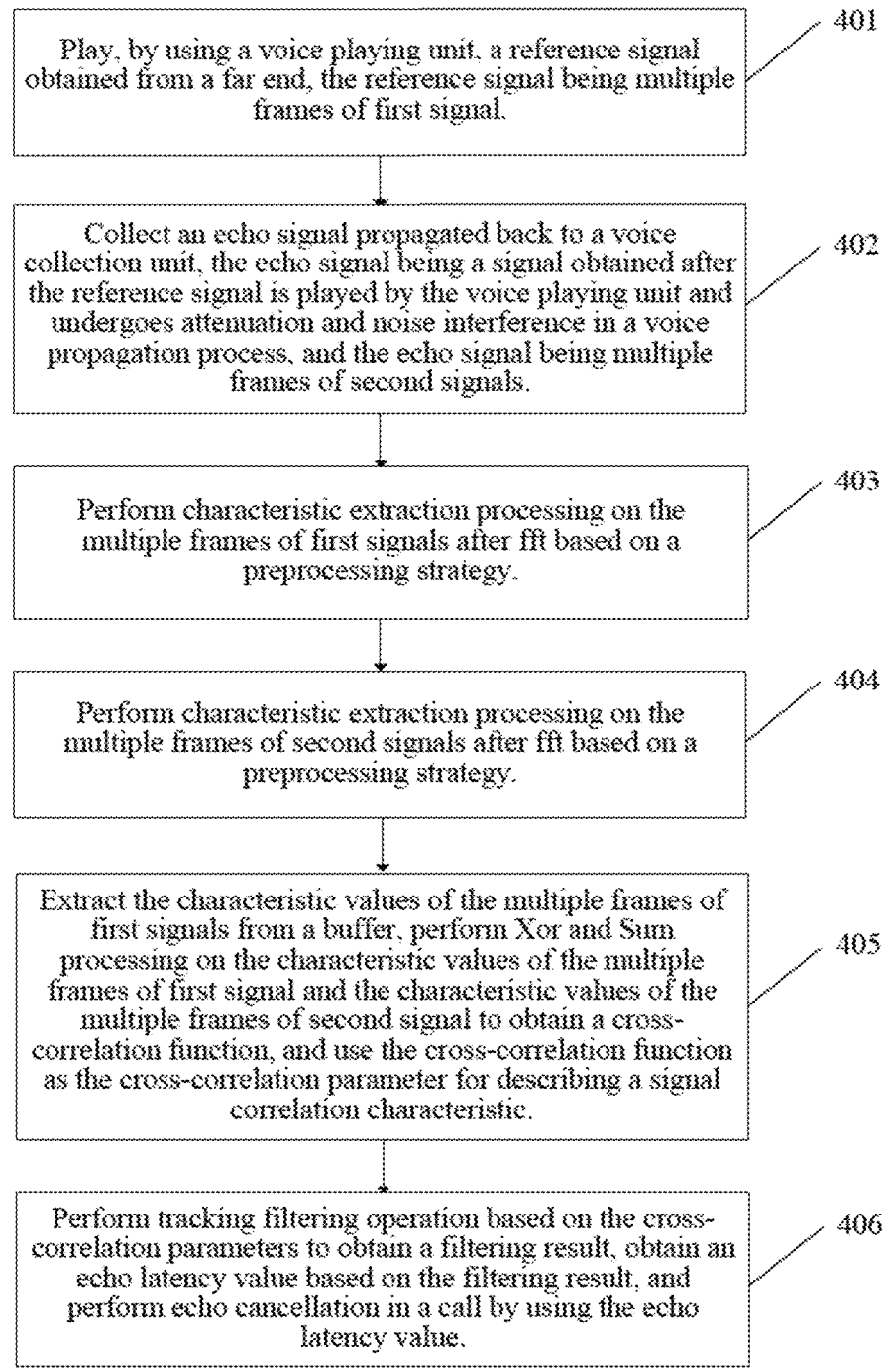
FIG. 12 is further another implementing schematic flowchart of the embodiment of the present disclosure.

An information processing method of the embodiment of the present disclosure, as shown in FIG. 12, comprises:

Step 401: Play, by using a voice playing unit, a reference signal obtained from a far end, the reference signal being multiple frames of first signal.

Here, the voice playing unit may be a loudspeaker, one example is that a voice signal played by the loudspeaker is propagated as a reference signal, one voice phoneme may cover multiple frames of signals, and the spectrum characteristics of these multiple frames of signals are very similar, that is, the spectrum binarized data of neighboring multiple frames of signals may be similar, and the overall sound variation state cannot be comprehensively reflected if subsequent comparison is performed by only using one frame of signal, that is because only when characteristic extraction has some difference, a precise echo latency value may be more easily calculated for the final echo cancellation processing, and therefore, in the embodiment of the present disclosure, multiple frames of signals are selected as the reference signals for subsequent characteristic extraction, referred to as multiple frames of first signals and multiple frames of reference signals for short.

Step 402: Collect an echo signal propagated back to a voice collection unit, the echo signal being a signal obtained after the reference signal is played by the voice playing unit and undergoes attenuation and/or noise interference in a voice propagation process, and the echo signal being multiple flames of second signals.

Here, the voice collection unit may be a microphone, one example is that the echo signal is collected by the microphone, and the echo signal is a signal obtained after the reference signal undergoes attenuation and or noise interference in a voice propagation process. For the microphone, the reference signal played by the loudspeaker may be referred to as a far-end signal, and the echo signal (or referred to as collection signal) collected by the microphone may be referred to as a near-end signal.

One voice phoneme may cover multiple flames of signals, and the spectrum characteristics of these multiple frames of signals are very similar, that is, the spectrum binarized data of neighboring multiple frames of signals may be similar, and the overall sound variation state cannot be comprehensively reflected if subsequent comparison is performed by only using one frame of signal, that is because only when characteristic extraction has some difference, a precise echo latency value may be more easily calculated for the final echo cancellation processing, and therefore, in the embodiment of the present disclosure, multiple frames of signals are selected as the echo signals for subsequent characteristic extraction, referred to as multiple frames of second signals and multiple frames of echo signals for short.

Step 403: Perform characteristic extinction processing on the multiple frames of first signals after fft based on a preprocessing policy.

Here, the preprocessing process may also be referred to as a characteristic extraction process, and in the characteristic extraction process, the characteristic values of multiple frames of first signals (or referred to as multiple frames of reference signals) need to be obtained for subsequent cross-correlation operation.

In the characteristic extraction processing process of the step, obtaining a first fft parameter obtained by performing fft transformation on the multiple frames of first signals; obtaining a first sampling frequency value; obtaining a first power spectrum corresponding to each frame of first signal based on the first fft parameter, the first sampling frequency value and a first frequency point parameter value and extracting the first power spectrum; and obtaining a smoothed value of the first power spectrum based on the first power spectrum corresponding to each frame of first signal and extracting the smoothed value.

In the characteristic extraction process, the method may also comprise: performing data binarization processing on the extracted first power spectrum corresponding to each frame of first signal and the smoothed value of the first power spectrum; recording a current value as 1 if the first power spectrum corresponding to each frame of first signal is greater than the smoothed value of the first power spectrum; otherwise, recording a current value as 0, wherein binary data corresponding to each frame of first signal is constructed by a combination of 1 and 0; performing multi-frame merging on the binarized data corresponding to each frame of first signal to obtain a binary data merging value of the multiple frames of first signals; determining the binary data merging value of the multiple frames of first signals as the characteristic value of the multiple frames of first signals; storing the characteristic values of the multiple frames of first signals into a buffer first, to be used in cross-correlation operation with the characteristic values of multiple frames of first signals in executing step 305 subsequently. The binary data merging value is formed by a current frame and at least one frame before the current frame.

Step 404: Perform characteristic extraction processing on the multiple frames of second signals after fit based on a preprocessing policy.

Here, the preprocessing process may also be referred to as a characteristic extraction process, and in the characteristic extraction process, the characteristic values of multiple frames of second signals (or referred to as multiple frames of echo signals) need to be obtained for subsequent cross-correlation operation.

In the characteristic extraction processing process of the step, obtaining a second fft parameter obtained by performing fft transformation on the multiple frames of second signals; obtaining a second sampling frequency value; obtaining a second power spectrum corresponding to each frame of second signal based on the second fft parameter, the second sampling frequency value and a second frequency point parameter value and extracting the second power spectrum; and obtaining a smoothed value of the second power spectrum based on the second power spectrum corresponding to each frame of second signal and extracting the smoothed value.

In the characteristic extraction process, the method may also comprise: performing data binarization processing on the extracted second power spectrum corresponding to each frame of second signal and the smoothed value of the second power spectrum; recording a current value as 1 if the second power spectrum corresponding to each frame of second signal is greater than the smoothed value of the second power spectrum; otherwise, recording a current value as 0, wherein binary data corresponding to each frame of second signal is constructed by a combination of 1 and 0; performing multi-frame merging on the binarized data corresponding to each frame of second signal to obtain a binary data merging value of the multiple frames of second signals; and determining the binary data merging value of the multiple frames of second signals as the characteristic value of the multiple frames of second signals. The binary data merging value is formed by a current frame and at least one frame before the current frame.

Policies for performing characteristic extraction in step 403 and step 404 may be the same or different, and in the situation of the same policy, the only difference is the operation parameters.

Step 405: Extract the characteristic values of the multiple frames of first signals from a buffer, perform Xor and Sum processing on the characteristic value of the multiple frames of first signal and the characteristic value of the multiple frames of second signal to obtain a cross-correlation function, and use the cross-correlation function as the cross-correlation parameter for describing a signal correlation characteristic.

Here, one example of cross-correlation parameters obtained by performing cross-correlation operation is a cross-correlation function, and the correlation between the characteristic values extracted from the multiple frames of reference signals and the multiple frames of echo signals may be compared based on the cross-correlation function. The embodiment of the present disclosure is a solution of solving the echo latency value by adopting a method of multi-frame characteristic merging of a far end and a near end and calculating the cross-correlation function. The far end refers to a loudspeaker playing terminal, and the near end refers to a microphone collecting terminal. One example is that: the near end uses three frames of signals with intervals being respectively D1(D1=10) and D2(D2=20), and, of course, may also use more than three frames of signals, the interval value designed here may be constant in the whole echo latency tracking process, and the advantage is that: it can be compared with an empirical value subsequently, and because the empirical value is relevant to a fixed interval, if the interval is not fixed, the selection of the empirical value may nest be precise. Fixed interval is a static selecting manner, and may also be a dynamic selecting manner such as a non-fixed interval, which will cause greater difference, thus being more favorable for preventing the situation that signal comparison is too similar, and therefore, the calculation of the echo latency value is more accurate, but, the selection of the empirical value may increase the processing cost.

In the embodiment of the present disclosure, a link of multiple frames of binary data merging is newly increased, and Xor and Sum calculation is performed for the cross-correlation operation by virtue of the merging value of multiple frames (multiple frames of binarized data).

Step 406: Perform tracking filtering operation based on the cross-correlation parameters to obtain a filtering result, obtain an echo latency value based on the filtering result, and perform echo cancellation in a call by using the echo latency value.

A specific processing process of the step comprises: performing weighted smoothing processing based on the cross-correlation parameters and the filtering coefficient to obtain a filtering result; the filtering result comprising multiple numerical values, selecting a candidate latency value from the multiple numerical values according to a minimum rule; and using, if the candidate latency value complies with an empirical value, the candidate latency value complying with the empirical value as the echo latency value.

Here, by virtue of the steps, precise echo latency detection is implemented before echo cancellation processing, and a target value that complies with the requirement of the empirical value is selected from the filtering result to be used as the echo latency value. In echo latency detection, time difference, namely echo latency, between, the reference signal (a signal played by the loudspeaker) and an echo signal thereof is calculated first, to facilitate subsequent self-adaptive filtering echo cancellation and nonlinear echo suppression processing.

The embodiment of the present disclosure is a solution of solving the echo latency value by adopting a method of multi-frame characteristic merging of a far end and a near end and calculating the cross-correlation function, while in the related art, cross-correlation statistic is performed on one frame of signal of the near end and one frame of signal of the far end to obtain the echo latency value; because only one frame of signal is used for comparison for a far-end signal in the related art, the phenomenon that the cross-correlation values of neighboring frames of multiple continuous frames are similar or even same values, and are too similar, may occur, and therefore, no difference can be found out, and the cross-correlation parameters obtained by such calculation is not favorable for subsequent echo cancellation. While by adopting the embodiment of the present disclosure, it is required to be not too similar, and therefore, processing of multiple frames of signals is adopted; because multiple frames of signals have intervals, difference exists, and the cross-correlation parameters obtained by such calculation can be better for subsequent echo cancellation.

Figure 13:
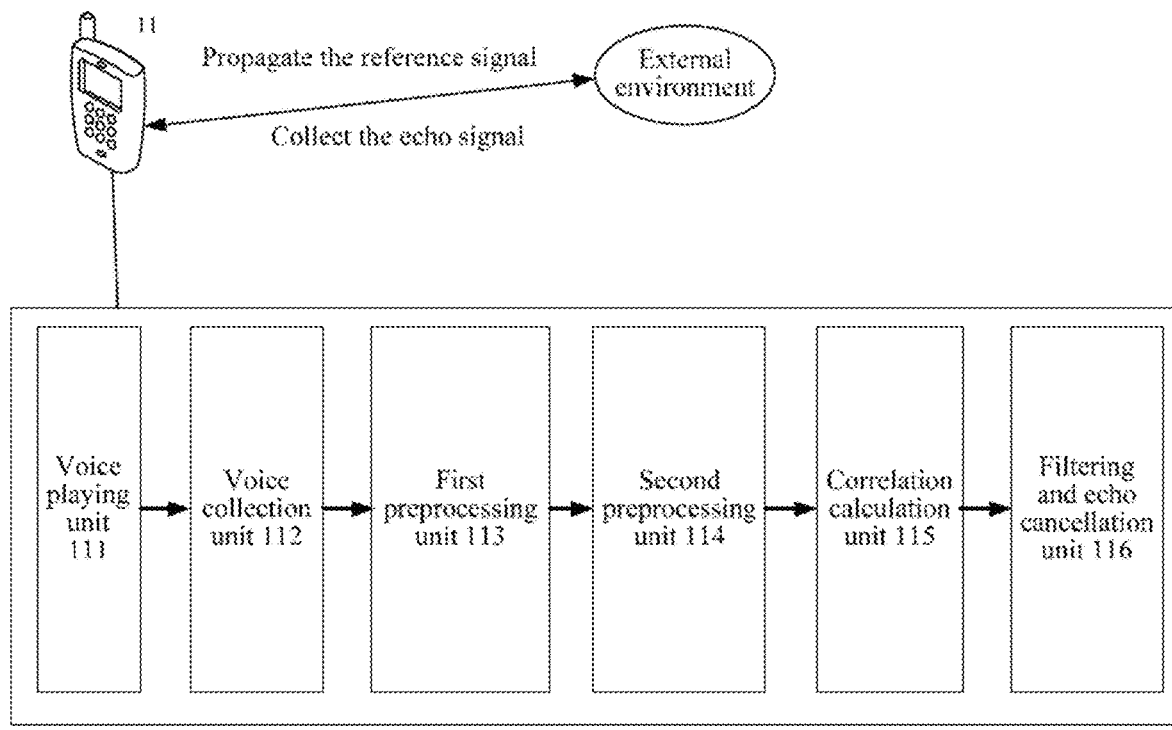
FIG. 13 a schematic structural diagram of a terminal composition applying the embodiment of the present disclosure.

A terminal of the embodiment of the present disclosure, as shown in FIG. 13, comprises: a voice playing unit 111, configured to play a reference signal obtained from a far end, the reference signal being multiple frames of first signals; a voice collection unit 112, configured to collect an echo signal, the echo signal being obtained after the reference signal is played by the voice playing unit and undergoes attenuation and/or noise interference in the propagation process, and the echo signals being multiple frames of second signals; a first preprocessing unit 113, configured to preprocess the multiple frames of first signals, to obtain the characteristic values of the multiple flames of first signals; a second preprocessing unit 114, configured to preprocess the multiple frames of second signals to obtain the characteristic values of the multiple frames of second signals; a correlation calculation unit 115, configured to perform cross-correlation operation on the characteristic values of the multiple frames of first signals and the characteristic values of the multiple frames of second signals to obtain cross-correlation parameters; and a filtering and echo cancellation unit 116, configured to perform tracking filtering operation on the cross-correlation parameters to obtain a filtering result, obtain an echo latency value based on the filtering result and perform echo cancellation in a call by using the echo latency value.

In a practical application, the voice playing unit may be a loudspeaker, one example is that a voice signal played by the loudspeaker is propagated as a reference signal, one voice phoneme may cover multiple frames of signals, and the spectrum characteristics of these multiple frames of signals are very similar, that is, the spectrum binarization data of neighboring multiple frames of signals may be similar, and the overall sound variation state cannot be comprehensively reflected if subsequent comparison is performed by only using one frame of signal, that is because only when characteristic extraction has some difference, a precise echo latency value may be more easily calculated for the final echo cancellation processing, and therefore, in the embodiment of the present disclosure, multiple flames of signals are selected as the reference signals for subsequent characteristic extraction, referred to as multiple frames of first signals and multiple frames of reference signals for short. The voice collection unit may be a microphone, one example is that the echo signal is collected by the microphone, and the echo signal is a signal obtained after the reference signal undergoes attenuation and/or noise interference in a voice propagation process. For the microphone, the reference signal played by the loudspeaker may be referred to as a far-end signal, and the echo signal (or referred to as collection signal) collected by the microphone may be referred to as a near-end signal One voice phoneme may cover multiple frames of signals, and the spectrum characteristics of these multiple frames of signals are very similar, that is, the spectrum binarization data of neighboring multiple frames of signals may be similar, and the overall sound variation state cannot be comprehensively reflected if subsequent comparison is performed by only using one frame of signal, that is because only when characteristic extraction has some difference, a precise echo latency value may be more easily calculated for the final echo cancellation processing, and therefore, in the embodiment of the present disclosure, multiple frames of signals are selected as the echo signals for subsequent characteristic extraction, referred to as multiple frames of second signals and multiple frames of echo signals for short.

The preprocessing process executed by the first preprocessing unit may also be referred to as a characteristic extraction process, and in the characteristic extraction process, the characteristic values of multiple frames of first signals (or referred to as multiple frames of reference signals) need to be obtained for subsequent cross-correlation operation. The preprocessing process executed by the second preprocessing unit may also be referred to as a characteristic extraction process, and in the characteristic extraction process, the characteristic values of multiple frames of second signals (or referred to as multiple frames of echo signals) need to be obtained for subsequent cross-correlation operation. Policies for different preprocessing units to perform characteristic extraction may be the same or different, and in the situation of the same policy, the only difference is the operation parameters.

One example of cross-correlation parameters obtained by performing cross-correlation operation by the correlation calculation unit is a cross-correlation function, and the correlation between the characteristic values extracted from the multiple frames of reference signals and the multiple frames of echo signals may be compared based on the cross-correlation function. The embodiment of the present disclosure is a solution of solving the echo latency value by adopting a method of multi-frame characteristic merging of a far end and a near end and calculating the cross-correlation function. The far end refers to a loudspeaker playing terminal, and the near end refers to a microphone collecting terminal One example is that: the near end uses three frames of signals with intervals being respectively D1(D1=10) and D2(D2=20), and, of course, may also use more than three frames of signals, the interval value designed here may be constant in the whole echo latency tracking process, and the advantage is that: it can be compared with an empirical value subsequently, and because the empirical value is relevant to a fixed interval, if the interval is not fixed, the selection of the empirical value may not be precise. Fixed interval is a static selecting manner, and may also be a dynamic selecting manner such as a non-fixed interval, which will cause greater difference, thus being more favorable for preventing the situation that signal comparison is too similar; and therefore, the calculation of the echo latency value is more accurate, but, the selection of the empirical value may increase the processing cost. In the embodiment of the present disclosure, a link of multiple frames of binary data merging is newly increased, and Xor and Sum calculation is performed for the cross-correlation operation by virtue of the merging value of multiple flames (multiple frames of binarized data).

Precise echo latency detection is implemented before echo cancellation processing, and a target value that complies with the requirement of the empirical value is selected from the filtering result to be used as the echo latency value. In echo latency detection, time difference, namely echo latency, between the reference signal (a signal played by the loudspeaker) and an echo signal thereof is calculated first, to facilitate subsequent self-adaptive filtering echo cancellation and nonlinear echo suppression processing. The embodiment of the present disclosure is a solution of solving the echo latency value by adopting a method of multi-frame characteristic merging of a far end and a near end and calculating the cross-correlation function, while in the related art, cross-correlation statistic is performed on one frame of signal of the near end and one frame of signal of the far end to obtain the echo latency value; because only one frame of signal is used for comparison for a far-end signal in the related art, the phenomenon that the cross-correlation values of neighboring frames of multiple continuous frames are similar or even same values, and are too similar, may occur, and therefore, no difference can be found out, and the cross-correlation parameters obtained by such calculation is not favorable for subsequent echo cancellation. While by adopting the embodiment of the present disclosure, it is required to be not too similar, and therefore, processing of multiple frames of signals is adopted; because multiple frames of signals have intervals, difference exists, and the cross-correlation parameters obtained by such calculation can be better for subsequent echo cancellation.

In an implementation manner of the embodiment of the present disclosure, the first preprocessing unit is further configured to: perform characteristic extraction processing on the multiple frames of first signals alter fft based on a preprocessing policy, and specifically, obtain a first fft parameter obtained by performing fft transformation on the multiple frames of first signals; obtain a first sampling frequency value; obtain a first power spectrum corresponding to each frame of first signal based on the first fft parameter, the first sampling frequency value and a first frequency point parameter value and extracting the first power spectrum; and obtain a smoothed value of the first power spectrum based on the first power spectrum corresponding to each frame of first signal and extracting the smoothed value.

In an implementation manner of the embodiment of the present disclosure, the first preprocessing unit, is further configured to: perform data binarization processing on the extracted first power spectrum corresponding to each frame of first signal and the smoothed value of the first power spectrum; record a current value as 1 if the first power spectrum corresponding to each frame of first signal is greater than the smoothed value of the first power spectrum; otherwise, recording a current value as 0, wherein binary data of each frame of first signal is constructed by a combination of 1 and 0; perform multi-frame merging on the binarized data corresponding to each frame of first signal to obtain a binary data merging value of the multiple frames of first signals; and determine the binary data merging value of the multiple frames of first signals as the characteristic value of the multiple frames of first signals.

In an implementation manner of the embodiment of the present disclosure, the second preprocessing unit is further configured to: perform characteristic extraction processing on the multiple frames of second signals after fft based on a preprocessing policy, and specifically, obtain a second fft parameter obtained by performing fft transformation on the multiple frames of second signals; obtain a second sampling frequency value; obtain a second power spectrum corresponding to each frame of second signal based on the second fft parameter, the second sampling frequency value and a second frequency point parameter value and extracting the second power spectrum; and obtain a smoothed value of the second power spectrum based on the second power spectrum corresponding to each frame of second signal and extracting the smoothed value.

In an implementation manner of the embodiment of the present disclosure, the terminal further comprises: a binarization processing unit, configured to: perform data binarization processing on the extracted second power spectrum corresponding to each frame of second signal and the smoothed value of the second power spectrum; record a current value as 1 if the second power spectrum corresponding to each frame of second signal is greater than the smoothed value of the second power spectrum; otherwise, recording a current value as 0, wherein binary data of each frame of second signal is constructed by a combination of 1 and 0; perform multi-frame merging on the binarized data corresponding to each frame of second signal to obtain a binary data merging value of the multiple frames of second signals; and determine the binary data merging value of the multiple frames of second signals as the characteristic value of the multiple frames of second signals.

In an implementation manner of the embodiment of the present disclosure, the correlation calculation unit is further configured to: extract the characteristic values of the multiple frames of first signals from a buffer, perform Xor and Sum processing on the characteristic value of the multiple frames of first signal and the characteristic value of the multiple frames of second signal to obtain a cross-correlation function, and use the cross-correlation function as the cross-correlation parameter for describing a signal correlation characteristic.

In an implementation manner of the embodiment of the present disclosure, the filtering and echo cancellation unit is further configured to: perform weighted smoothing processing based on the cross-correlation parameters and the filtering coefficient to obtain a filtering result; the filtering result comprising multiple numerical values, select a candidate latency value from the multiple numerical values based on a minimum rule; and use, if the candidate latency value complies with an empirical value, the candidate latency value complying with the empirical value as the echo latency value.

For a processor configured to process data, processing may be executed by adopting a microprocessor, a central processing unit (CPU), a digital signal processor (DSP) or a field-programmable gate array (FPGA); and for a storage medium, an operation instruction is included, the operation instruction may be a computer executable code, and all steps in the flowchart, of the information processing method of the embodiment of the present disclosure are implemented by the operation instruction.

If should be noted that: description involving terminals and server items are similar to the description of the methods, beneficial effects of the methods are not further described herein. For technical details which are not disclosed in the embodiments of the terminals and the servers of the present disclosure, please refer to contents described by the embodiments described by the flowcharts of the method of the present disclosure.

In an application scenario of the embodiment of the present disclosure, detection for the echo latency value in echo cancellation processing, by adopting the embodiment of the present disclosure, is specifically an echo latency tracking solution based on multi-frame correlation.

Figure 14:
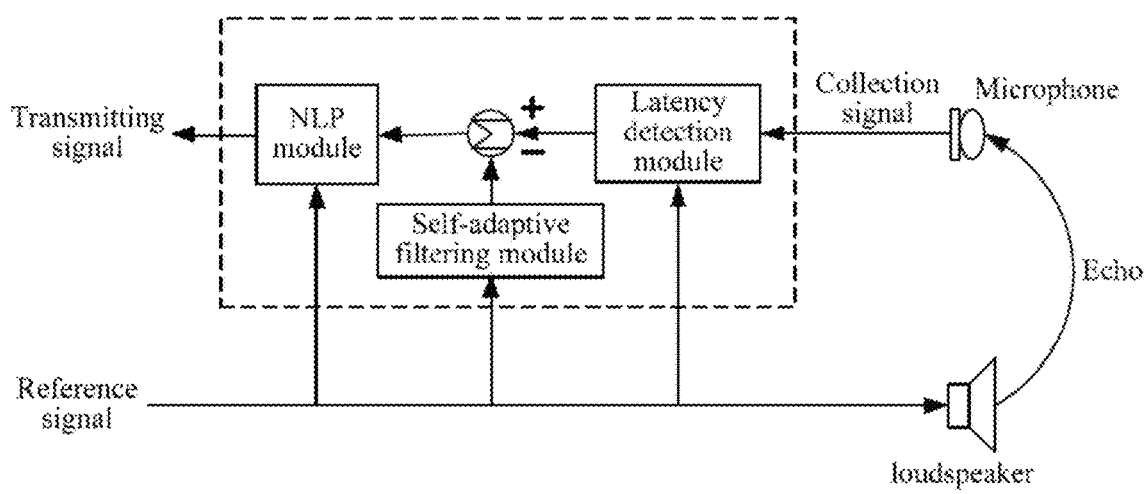
FIG. 14 is a schematic diagram of an implementing module of an echo cancellation algorithm in an application scenario applying the embodiment of the present disclosure.
Figure 15:
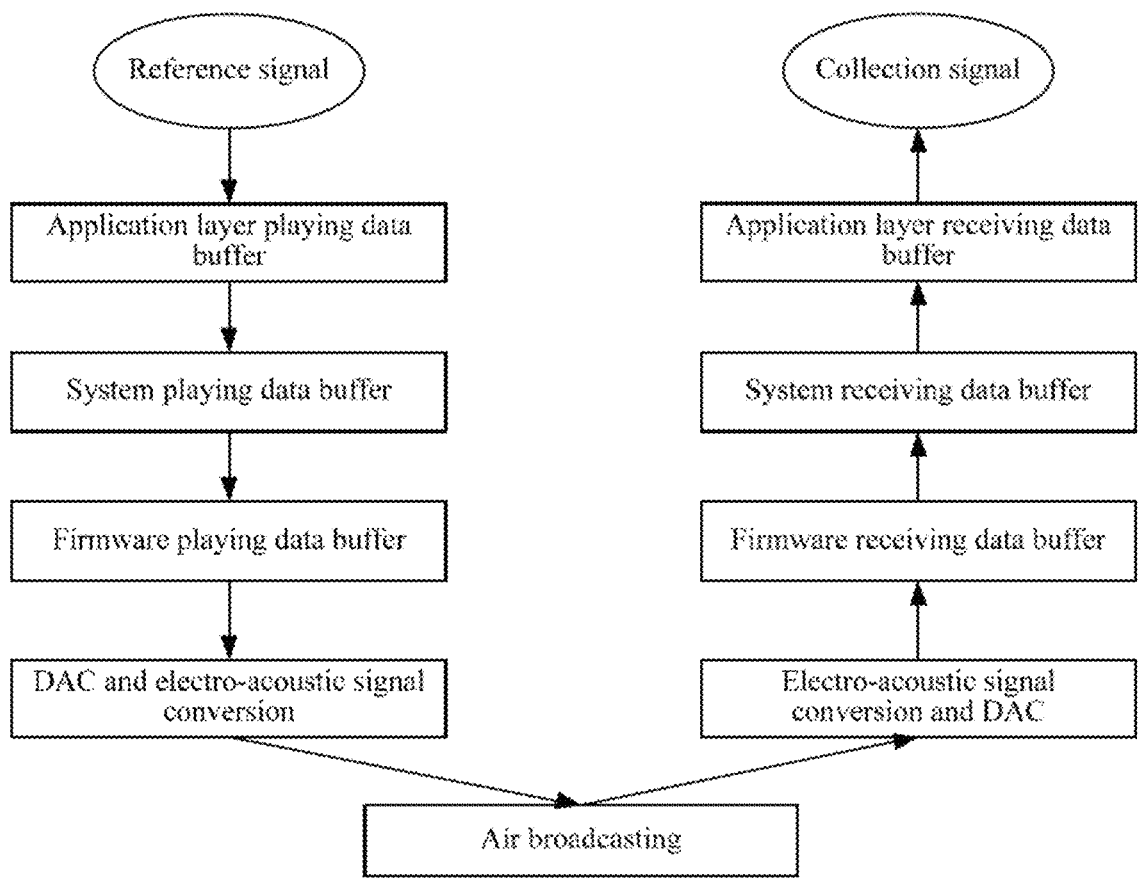
FIG. 15 is an implementing flowchart of related links produced by echo latency in an application scenario applying the embodiment of the present disclosure.

First, the so-called echo latency detection will be introduced, echo latency detection is a preprocessing link of an acoustic echo cancellation algorithm, and before echo cancellation processing, the time difference, namely echo latency, between the reference signal (a signal played by a loudspeaker) and the echo signal thereof is calculated first, to facilitate the subsequent self-adaptive filtering echo cancellation and nonlinear echo suppression processing. FIG. 14 shows a schematic diagram of echo latency detection, comprising an echo cancellation module, and the echo cancellation module further comprises: a latency detection module, a self-adaptive filtering module and a natural language processing (NLP) module; the reference signal is played by the loudspeaker and is propagated to the microphone, the microphone collects an echo signal, and a final transfer signal is obtained by the processing of each module in the echo cancellation module. As shown in FIG. 14, echo is generated in a manner that a sound reference signal is propagated by air via a loudspeaker of a call device and then picked up by the microphone. As shown in FIG. 15, because the echo signal needs to undergo various stages of buffering of an application layer, a system layer and a firmware and device bottom layer of a playing terminal and a collection terminal, these buffering may inevitably cause greater latency, and also because that the propagation process of sound in the air will cause the reference signal to reach the collection signal terminal with a greater delay, the echo cancellation module can perform echo cancellation on dualterminal signals aligned in time axis after latency elimination only after the latency detection module performs accurate detection on the latency.

Figure 16:
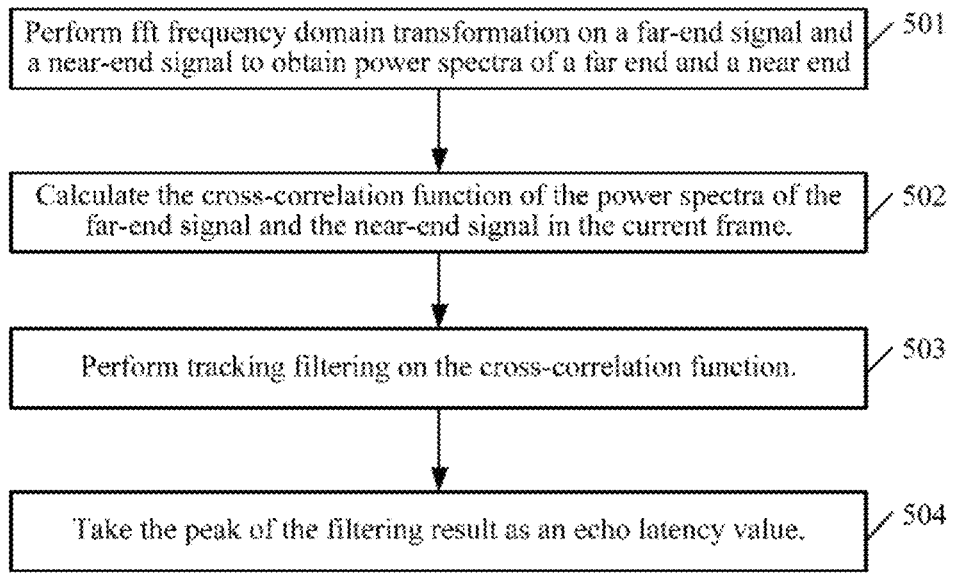
FIG. 16 is a calculation flowchart of related echo latency.

Aiming at the application scenario, in the related art, the maximal value of correlation is mainly searched based on the cross-correlation function operation of far-end and near-end signals, and time difference of two-frame signals at the far end and the near end, corresponding to the value, is the echo latency value. As shown in FIG. 16, the solution comprises:

Step 501: Perform fft frequency domain transformation on a far-end signal and a near-end signal to obtain power spectra of a far end and a near-end.

Step 502: Calculate the cross-correlation function of the power spectra of the far-end signal and the near-end signal in the current frame.

Step 503: Perform hacking filtering on the cross-correlation function.

Step 504: Take the peak of the filtering result as an echo latency value.

Figure 17:
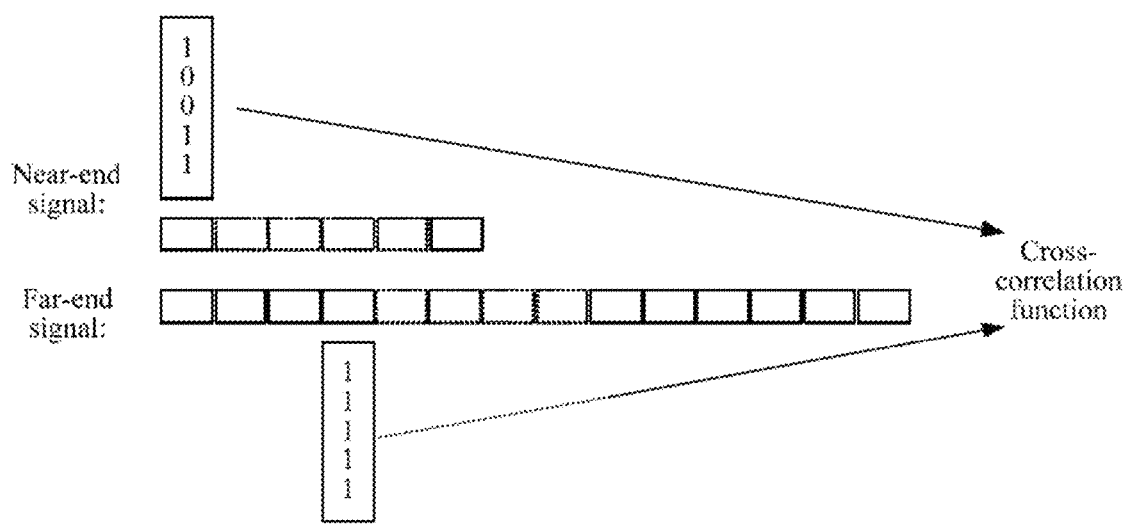
FIG. 17 is a single frame schematic structural diagram of related cross-correlation calculation.

As show in FIG. 17, single-frame signals at the far end and the near end are used for cross-correlation operation for implementing the related solution. The single-frame signals correspond to spectrum binarized data.

Figure 18:
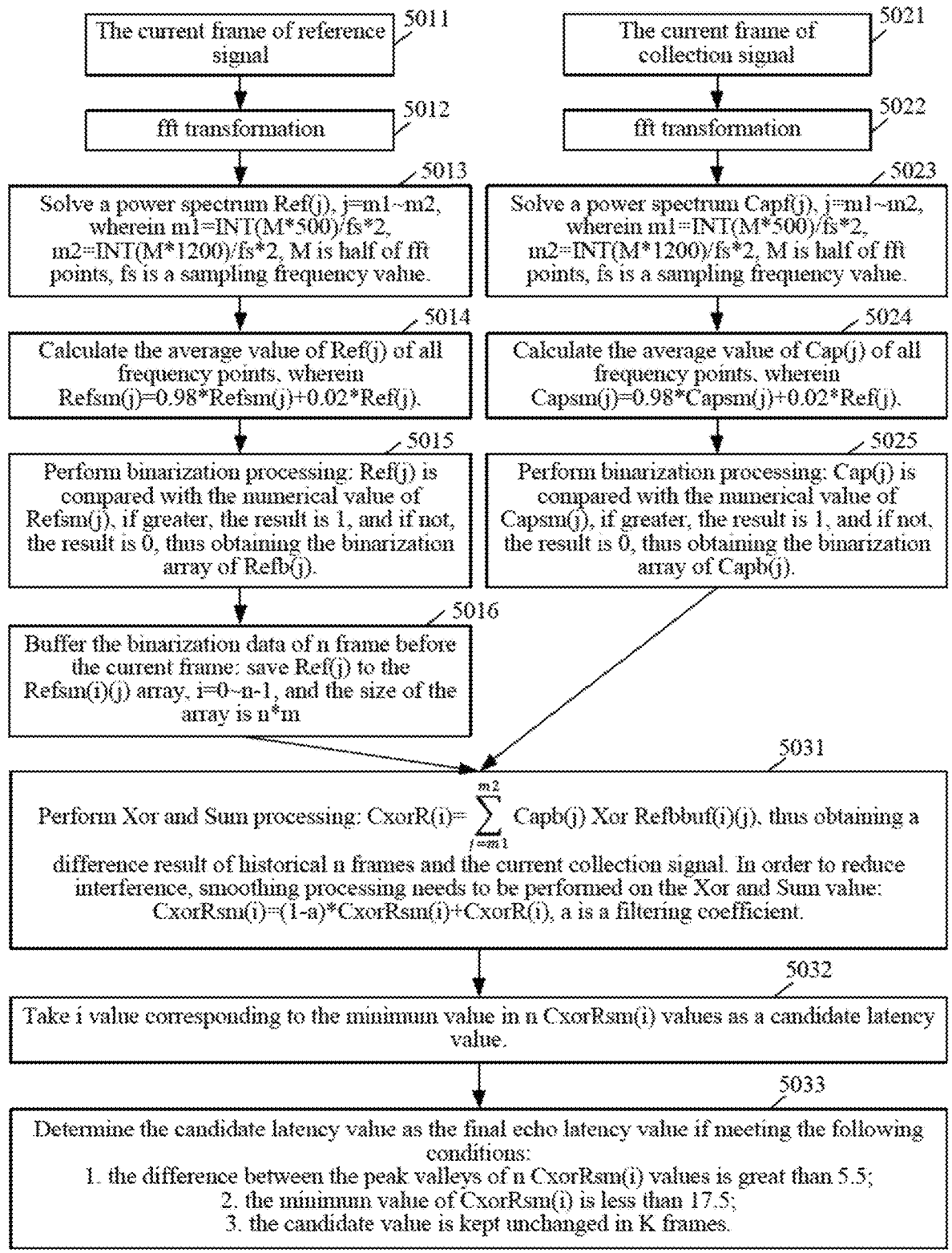
FIG. 18 is a tracking calculation flowchart of related echo latency.

FIG. 18 shows a specific example of the related echo latency tracking algorithm, comprising processing flowcharts of two branches.

The processing flowchart of the first branch is specific to the reference signal, comprising:

Steps 5011-5012: Perform fft transformation on the current frame of reference signal.

Step 5013: Solve a power spectrum Ref(j), j=m1~m2.

Wherein, m1=INT(M*500)/fs*2, m2=INT(M*1200)/fs*2, M is half of fft points, fs is a sampling frequency value.

Step 5014: Calculate the average value of Ref(j) of all frequency points.

The adopted formula is: Refsm(j)=0.98*Refsm(j)+0.02*Ref(j).

Step 5015: Perform binarization processing.

Wherein, Ref(j) is compared with the numerical value of Refsm(j), if greater, the result is 1, and if not, the result is 0, thus obtaining the binarization array of Refb(j).

Step 5016: Buffer the binarization data of n frames before the current, frame.

Wherein, Ref(j) is saved to the Refem(i)(j) array, i=0~n−1, and the size of the array is n*m.

The processing flowchart of the second branch is specific to the echo signal (or referred to as collection signal), comprising:

Steps 5021-5022: Perform fft transformation on the current frame of collection signal.

Step 5023: Solve a power spectrum Capf(j), j=m1~m2.

Wherein, m1=INT(M*500)/fs*2, m2=INT(M*1200)/fs*2, M is half of fft points, fs is a sampling frequency value.

Step 5024: Calculate the average value of Cap(j) of all frequency points.

The adopted formula is: Capsm(j)=0.98*Capsm(j)+0.02*Ref(j).

Step 5025: Perform binarization processing.

Wherein, Cap(j) is compared with the numerical value of Capsm(j), if greater, the result is 1, and if not, the result is 0, thus obtaining the binarization array of Capb(j).

Cross-correlation operation is performed on the finally obtained processing results of the two branches, comprising:

Step 5031: Perform Xor and Sum processing.

The adopted formula is:

$$CxorR(i) = \sum_{j=m1}^{m2}$$

Capb(j) Xor Refbbuf(i)(j), thus obtaining a difference result of historical n frames and the current collection signal.

In order to reduce interference, smoothing processing needs to be performed on the Xor and Sum value, and the adopted formula is:

CxorRsm(i)=(1−a)*CxorRsm(i)+CxorR(i), a is a filtering coefficient.

Step 5032: Take i value corresponding to the minimum value in n CxorRsm(i) values as a candidate latency value.

Step 5033: Determine the candidate latency value as the final echo latency value if meeting the following conditions.

The candidate latency value needs to be compared with an empirical value, and can be determined as the final echo latency value only if meeting the following three conditions:
  1. the difference between the peak valleys of n CxorRsm (i) values is great than 5.5;
  2. the minimum value of CxorRsm(i) is less than 17.5; and
  3. the candidate value is kept unchanged in K frames.

According to the echo latency research of the related solution, cross-correlation statistic is performed on one frame of signal of a near end and one frame of signal of a far end to obtain the echo latency value. Because a voice signal has the characteristic of short-time stability, that is, one voice phoneme may cover multiple frames of signals, and the spectrum characteristics of these multiple frames of signals are very similar, that is, the spectrum binarization data of neighboring multiple frames of signals may be similar, if only one frame of signal is used for comparison for a far-end signal in the related solution, the phenomenon that the cross-correlation values of neighboring frames of multiple continuous frames of the far end are similar or even same values, may occur, and with such calculation, neighboring candidate latency values of multiple arrays may be obtained, and the most accurate one can be extracted from the neighboring candidate values only after a relatively long time of calculated convergence, which is unfavorable for quickly obtaining a unique and accurate echo latency value.

Figure 19:
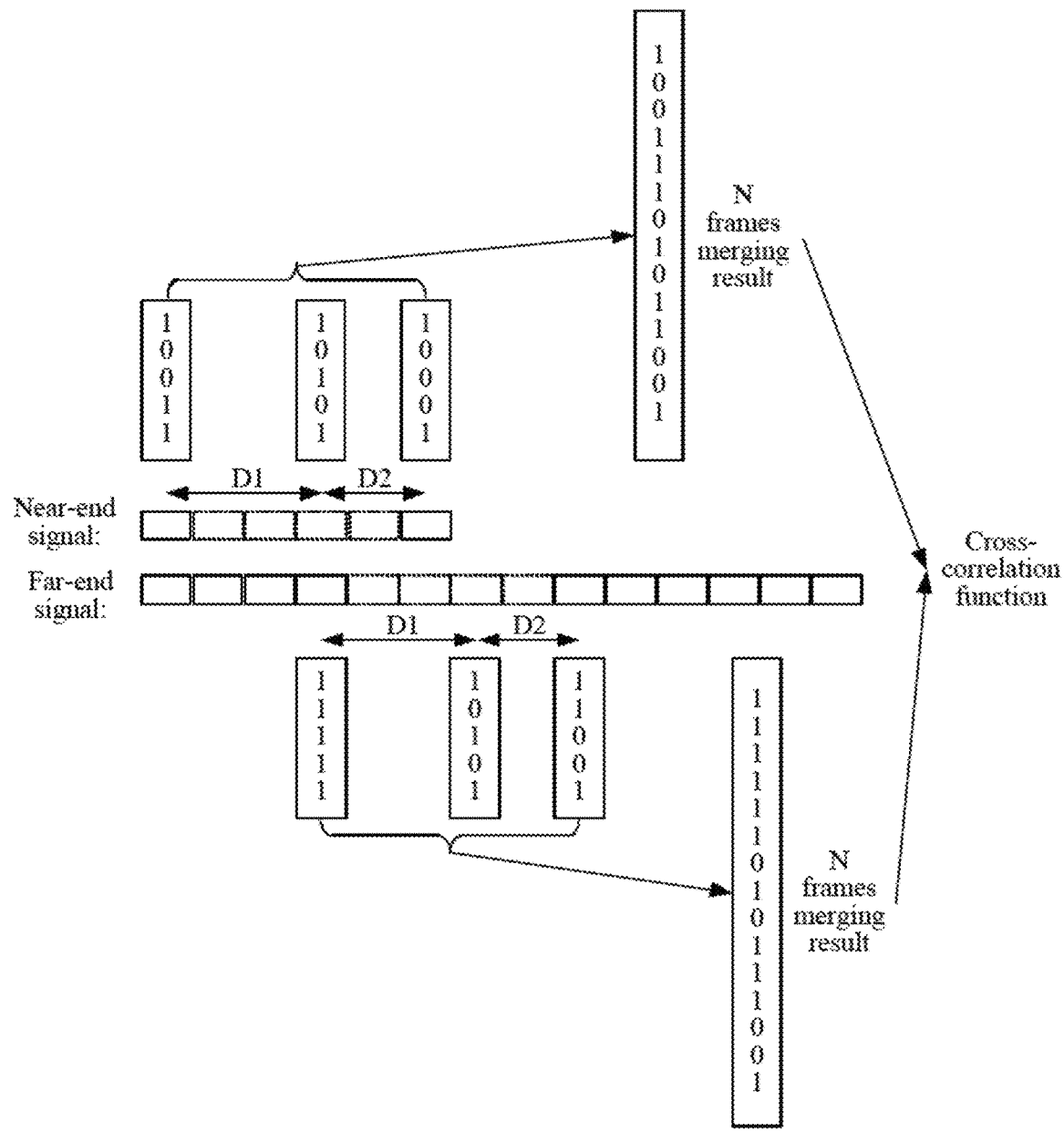
FIG. 19 is a multi-frame schematic structural diagram of cross-correlation calculation in an application scenario applying the embodiment of the present disclosure.
Figure 20:
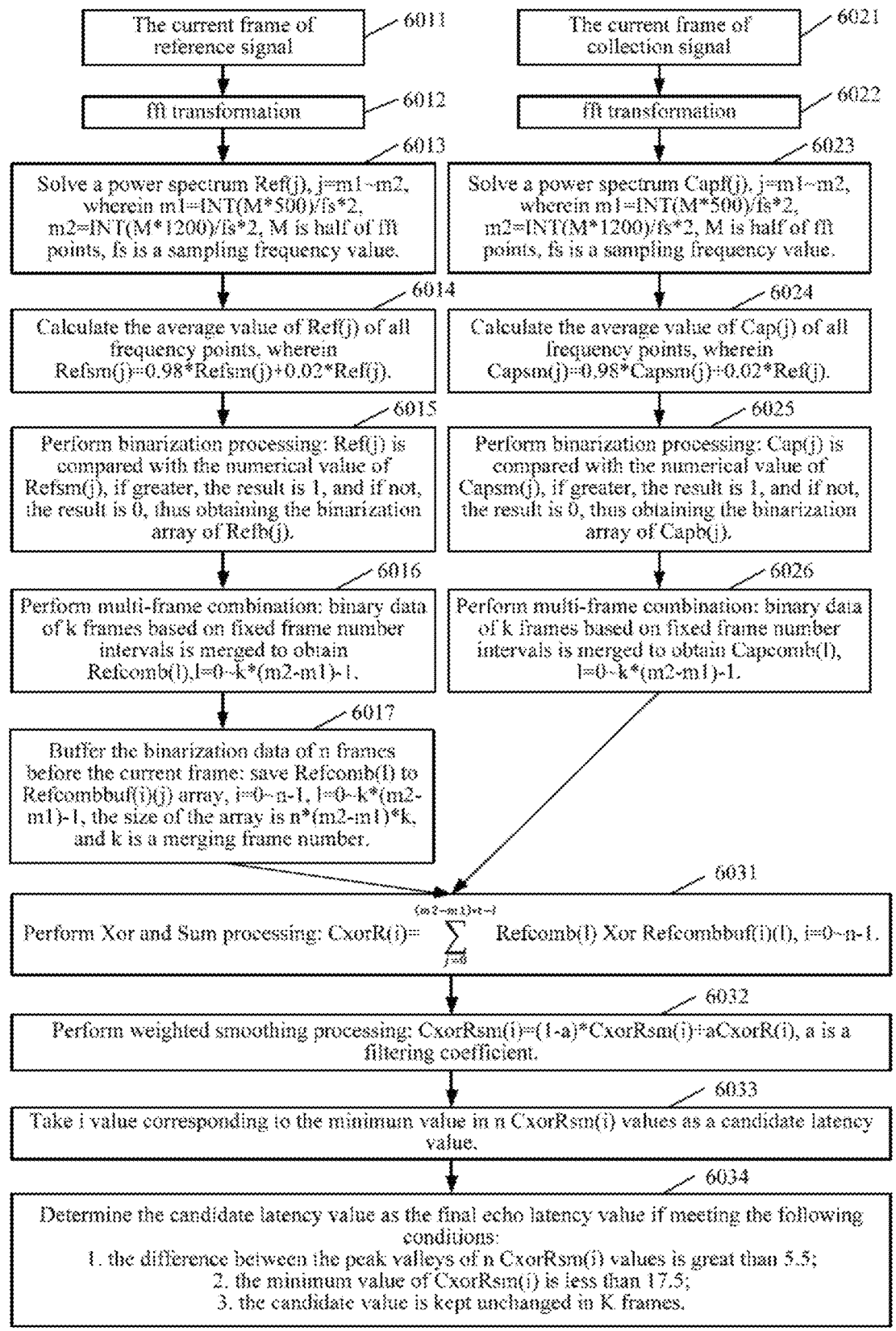
FIG. 20 is a tracking calculation flowchart of echo latency in an application scenario applying the embodiment of the present disclosure.

Aiming at the application scenario, a distinction between the embodiment of the present disclosure and the related solution is that multiple frames of signals of a near end and multiple frames of signal of a far end are adopted for performing cross-correlation operation in the present disclosure. One example is given in FIG. 19, three frames of signals (more than three frames of signal may also be used) with intervals of D1 D1(D1=10) and D2(D2=20) respectively are used for the near end, and the interval value designed here is constant in the whole echo latency tracking process, with the objective of avoiding, by utilizing multiple frames of data with certain intervals, the disadvantage that the characteristics of a voice phoneme cannot be well represented by single-frame data, and the echo latency value can be tracked more accurately and more rapidly by utilizing a manner of representing "surface characteristic" with "multi-line characteristic". As shown in FIG. 20, a link of multi-frame binary data merging is added based on the related solution, and all the subsequent cross-correlation operations are performed by virtue of the multi-frame merging value.

FIG. 20 shows a specific example of the echo latency tracking algorithm of the present disclosure, comprising processing flowcharts of two branches.

The processing flowchart of the first branch is specific to the reference signal, comprising:

Steps 6011-6012: Perform fft transformation on the current frame of reference signal.

Step 6013: Solve a power spectrum Ref(j), j=m1~m2.

Wherein, m1=INT(M*500)/fs*2, m2=INT(M*1200)/fc*2, M is half of fft points, fs is a sampling frequency value.

Step 6014: Calculate the average value of Ref(j) of all frequency points.

The adopted formula is:

Refsm(j)=0.98*Refsm(j)+0.02*Ref(j).

Step 6015: Perform binarization processing.

Wherein, Ref(j) is compared with the numerical value of Refsm(j), if greater, the result is 1, and if not, the result is 0, thus obtaining the binarization array of Refb(j).

Step 6016: Perform multi-frame combination.

Wherein, binary data of k frames based on fixed frame number intervals is merged to obtain Refcomb(l), l=0~k*(m2−m1)−1.

Step 6017: Buffer the binarized data of n frames before the current frame.

Wherein, Refcomb(l) is saved to Refcombbuf(i)(j) array, i=0~n−1, l=0~k*(m2−m1)−1, the size of the array is n*(m2−m1)*k, and k is a merging frame number.

The processing flowchart of the second branch is specific to the echo signal (or referred to as collection signal), comprising:

Steps 6021-6022: Perform fft transformation on the current frame of collection signal.

Step 6023: Solve a power spectrum Capf(j), j=m1~m2.

Wherein, m1=INT(M*500)/fs*2, m2=INT(M*1200)/fs*2, M is half of fft points, fs is a sampling frequency value.

Step 6024: Calculate the average value of Cap(j) of all frequency points.

The adopted formula is: Capsm(j)=0.98*Capsm(j)+0.02*Ref(j).

Step 6025: Perform binarization processing.

Wherein, Cap(j) is compared with the numerical value of Capsm(j), if greater, the result is 1, and if not, the result is 0, thus obtaining the binarization array of Capb(j).

Step 6026: Perform multi-frame combination.

Wherein, binary data of k frames based on fixed frame number intervals is merged to obtain Capcomb(l), l=0~k*(m2−m1)−1.

Cross-correlation operation is performed on the finally obtained processing results of the two branches, comprising:

Step 6031: Perform Xor and Sum processing.

The adopted formula is:

$$CxorR(i) = \sum_{j=0}^{(m2-m1)*t-l}$$

Refcomb(l) Xor Refcombbuf(i)(l), i=0~n−1.

Step 6032: Perform smoothing processing on the Xor and Sum value in order to reduce interference, the adopted formula being:

CxorRsm(i)=(1−a)*CxorRsm(i)+aCxorR(i), a being a filtering coefficient.

Step 6033: Take i value corresponding to the minimum value in n CxorRsm(i) values as a candidate latency value.

Step 6034: Determine the candidate latency value as the final echo latency value if meeting the following conditions.

The candidate latency value needs to be compared with an empirical value, and can be determined as the final echo latency value only if meeting the following three conditions:
1. the difference between the peak valleys of n CxorRsm(i) values is great than 0.17*(k*(m2−m1)−1);
2. the minimum value of CxorRsm(i) is less than 0.55*(k*(m2−m1)−1); and
3. the candidate value is kept unchanged in K frames. [JL1]

It should be noted that, for empirical value comparison mentioned herein, all involved empirical values are derived from experience, and may be correspondingly adjusted based on the actual processing process in actual operation, without being limited by the scope of the empirical values described herein.

Figure 21:
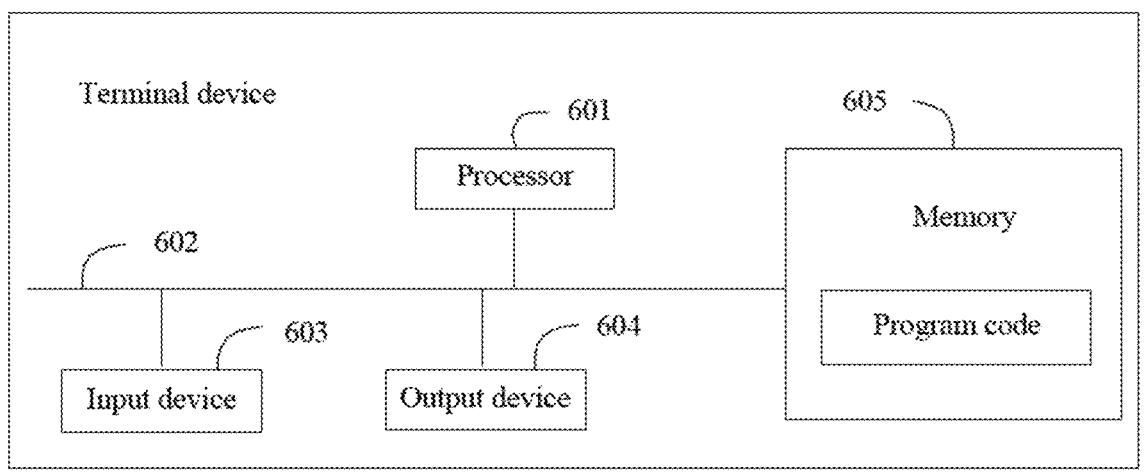
FIG. 21 is a schematic structural diagram of a terminal composition applying the embodiment of the present disclosure.

The embodiment of the present disclosure further provides a computer storage medium, as shown in FIG. 21, for example, comprising a memory 605 of a computer program, and the computer program may be executed by a processor 601 of a data processing device, to complete the steps of the abovementioned methods. The computer storage medium may be memories such as FRAM, ROM, PROM, EPROM, EEPROM, Flash Memory, a magnetic surface memory, an optical disk, or CD-ROM; may also be various devices comprising one of or any combination of the memories, such as a mobile phone, a computer, a tablet device and a personal digital assistant.

A computer readable storage medium provided by the embodiment of the present disclosure stores a computer program, and when the computer program is operated by the processor, the following steps of the echo cancellation method are executed.

In one embodiment when the computer program is operated by the processor, executing:
  playing, by using a voice playing unit, a reference signal obtained from a far end, the reference signal being at least one frame of first signal;
  collecting an echo signal propagated back to a voice collection unit, the echo signal being a signal obtained after the reference signal is played by the voice playing unit and undergoes attenuation and noise interference in a voice propagation process, and the echo signal being at least one frame of second signal;
  respectively obtaining, when at least one frame of signal is preprocessed, a characteristic value corresponding to the at least one frame of first signal and a characteristic value corresponding to the at least one frame of second signal from the at least one frame of first signal and the at least one frame of second signal;

performing a cross-correlation operation on the characteristic value of the at least one frame of first signal and the characteristic value of the at least one frame of second signal, to obtain a cross-correlation parameter; and performing echo cancellation processing based on the cross-correlation parameter.

In one embodiment, when the computer program is operated by the processor, executing:

performing a tracking filtering operation based on the cross-correlation parameter to obtain a filtering result, obtaining an echo latency value based on the filtering result, and performing echo cancellation in a call by using the echo latency value.

In one embodiment when the computer program is operated by the processor, executing:

obtaining a first FFT parameter obtained by performing FFT transformation on the at least one frame of first signal;

obtaining a first sampling frequency value;

obtaining a first power spectrum corresponding to each frame of first signal based on the first FFT parameter, the first sampling frequency value, and a first frequency parameter value, and extracting the first power spectrum; and obtaining a smoothed value of the first power spectrum based on the first power spectrum corresponding to each frame of first signal, and extracting the smoothed value.

In one embodiment, when the computer program is operated by the processor, executing:

performing data binarization processing on the extracted first power spectrum corresponding to each frame of first signal and the smoothed value of the first power spectrum;

recording a current value as 1 if the first power spectrum corresponding to each frame of first signal is greater than the smoothed value of the first power spectrum; otherwise, recording a current value as 0, wherein binarized data corresponding to each frame of first signal is constructed by a combination of 1 and 0; and performing multi-frame merging on the binarized data corresponding to each frame of first signal to obtain a binary data merging value of the at least one frame of first signal, and determining the binary data merging value of the at least one frame of first signal as the characteristic value of the at least one frame of first signal.

In one embodiment, when the computer program is operated by the processor, executing:

obtaining a second FFT parameter obtained by performing FFT transformation on the at least one frame of second signal;

obtaining a second sampling frequency value;

obtaining a second power spectrum corresponding to each frame of second signal based on the second FFT parameter, the second sampling frequency value, and a second frequency parameter value, and extracting the second power spectrum; and obtaining a smoothed value of the second power spectrum based on the second power spectrum corresponding to each frame of second signal, and extracting the smoothed value.

In one embodiment, when the computer program is operated by the processor, executing:

performing data binarization processing on the extracted second power spectrum corresponding to each frame of second signal and the smoothed value of the second power spectrum;

recording a current value as 1 if the second power spectrum corresponding to each frame of second signal is greater than the smoothed value of the second power spectrum; otherwise, recording a current value as 0, wherein binary data of each frame of second signal is constructed by a combination of 1 and 0; and performing multi-frame merging on the binarized data corresponding to each frame of second signal to obtain a binary data merging value of the at least one frame of second signal, and determining the binary data merging value of the at least one frame of second signal as the characteristic value of the at least one frame of second signal.

In one embodiment, when the computer program is operated by the processor, executing:

extracting the characteristic value of the at least one frame of first signal from a buffer, performing Xor and Sum processing on the characteristic value of the at least one frame of first signal and the characteristic value of the at least one frame of second signal to obtain a cross-correlation function, and using the cross-correlation function as the cross-correlation parameter for describing a signal correlation characteristic.

In one embodiment, when the computer program is operated by the processor, executing:

performing weighted smoothing processing based on the cross-correlation parameter and a filtering coefficient to obtain the filtering result, wherein the filtering result comprises a plurality of values;

selecting candidate latency value from the plurality of values according to a minimum rule; and using, if the candidate latency value complies with an empirical value, the candidate latency value complying with the empirical value as the echo latency value.

In several embodiments provided by the present application, it is should be understood that, the disclosed device and method may be implemented by other manners. The embodiments of the described devices are only schematic, for example, partition of the unit is only a logic functional partition, and may have other partition manner in actual application, for instance: multiple units or components may be combined, or may be integrated to another system, or some characteristics may be neglected, or not executed. In addition, coupling, or direction coupling, or communication connection between all shown or discussed constituent parts may be implemented by some interfaces, and indirect coupling or communication connection between devices or units may be electric, mechanical or in other forms.

The units illustrated as separate components may be, or may not be physically separated, components displayed as units may be, or may not be physical units, may be located in one place, and may also be distributed to multiple network units; partial or all units therein may be selected according to actual requirements to realize the aim of the solution of the embodiment.

In addition, all functional units in all embodiments of the present disclosure may be integrated into one processing unit or each unit serves as a unit independently, or two or more than two units are integrated info one unit; the integrated unit may be implemented in a form of hardware, and may also be implemented in a form of hardware and software functional unit.

A person of ordinary skill in the art may understand that all or some of the steps of the foregoing embodiments may be implemented by a program instructing relevant hardware. The program may be stored in a computer readable storage medium. When the program is executed, steps of the embodiments comprising the foregoing method are executed. The storage medium comprises various media capable of storing program codes, such as a portable storage device, a read-only memory (ROM), a random access memory (RAM), a magnetic disk or an optical disc.

Or, the foregoing integrated unit may also be stored in a computer readable storage medium when being implemented in the form of a software functional unit or sold or used as an independent product. Based on such understanding, the technical solution of the embodiment of the present disclosure essentially or the parts contributing to the related art may be shown in the form of a software product, and the computer software product is stored in a storage medium and comprises a plurality of instructions so that computer equipment (may be a personal computer, a server, or a network equipment, etc.) executes all or partial of the methods descried in each embodiment of the present disclosure. While the foregoing storage medium comprises various media capable of storing program codes, such as a portable storage device, ROM, RAM, a magnetic disk or an optical disc.

The foregoing is only the specific implementation manners of the present disclosure, but the protection scope of the present disclosure is not limited to this, and variations or substitutions easily found by any person skilled in the art in the technical scope disclosed by the present disclosure should all fall within the protection scope of the present disclosure. Therefore, the protection scope of the present disclosure should be subject to the protection scope required by the appended claims.

INDUSTRIAL APPLICABILITY

According to the embodiment of the present disclosure, before echo cancellation, at least one frame of signal is preprocessed, to comprehensively evaluate the overall sound variation state to improve the stability and precision of echo cancellation. Specifically, in the process of echo cancellation, on one hand, while meeting the condition that the estimated latency value between each frame of first voice signal and the corresponding reference signal is stabilized in a preset range, the at least one frame of reference signal is used for performing echo cancellation processing on the echo signal in the at least one frame of voice signal, to avoid the problem that fluctuation of the difference between the buffer size of the reference signal and the buffer size of the echo signal is great, and thus improving the stability and precision of echo cancellation. On the other hand, cross-correlation operation is performed by using the characteristic value of the first signal and the characteristic value of the second signal obtained from the at least one frame of first signal and the at least one frame of second signal, to obtain cross-correlation parameters, and echo cancellation is performed based on the cross-correlation parameters, so that information irrelevant to the characteristic values may be excluded, and thus improving the stability and precision of echo cancellation.

What is claimed is:

1. An echo cancellation method, comprising:
   collecting frames of a first voice signal;
   buffering the frames of the first voice signal, the frames of the first voice signal including an echo signal;
   when the frames of the first voice signal are preprocessed, separately obtaining, in a first timing period, the frames of the first voice signal from a buffer and frames of a reference signal matching the frames of the first voice signal from a reference signal queue, so that an estimated latency value, between each frame of the first voice signal and the reference signal, remains within a preset range;
   performing, by processing circuitry of a terminal device, echo cancellation processing on the echo signal in the frames of the first voice signal using the frames of the reference signal, to generate frames of a second voice signal; and
   outputting the frames of the second voice signal, wherein
   the estimated latency value is based on cross-correlation parameters, the cross-correlation parameters being determined based on a cross-correlation operation that is performed on first characteristic values of the frames of the first voice signal and second characteristic values of the frames of the reference signal.

2. The method according to claim 1, wherein before the frames of the first voice signal is collected, the method further comprises:
   receiving frames of a third voice signal;
   buffering the frames of the third voice signal, wherein the frames of the first voice signal comprises at least a signal that is the same as the frames of the third voice signal;
   obtaining the frames of the third voice signal in a second timing period; and
   decoding the frames of the third voice signal to generate the frames of the reference signal, and adding the generated frames of the reference signal to the reference signal queue.

3. The method according to claim 2, wherein the first timing period or the second timing period is obtained based on a frame length that is selected by an audio encoder performing encoding.

4. The method according to claim 2, further comprising:
   obtaining a buffer size of the frames of the first voice signal based on a minimum buffer size of recording circuitry of an audio card in the terminal device and a first buffer coefficient.

5. The method according to claim 4, further comprising:
   obtaining a buffer size of the frames of the third voice signal based on a minimum buffer size of playback circuitry of the audio card in the terminal device and a second buffer coefficient.

6. The method according to claim 5, further comprising:
   filling the playback circuitry of the audio card and the reference signal queue with temporary data when there is no usable voice signal in the buffer in the first timing period, wherein the temporary data is a sequence including 0.

7. A non-transitory computer storage medium, storing a computer executable instruction, the computer executable instruction being used to perform the echo cancellation method according to claim 1.

8. A terminal for echo cancellation, comprising:
processing circuitry configured to
collect frames of a first voice signal,
buffer the frames of the first voice signal in a first buffer, the frames of the first voice signal including an echo signal,
when the frames of the first voice signal are preprocessed, separately obtain in a first timing period, the frames of the first voice signal from the first buffer and frames of a reference signal matching the frames of the first voice signal from a reference signal queue, so that an estimated latency value, between each frame of the first voice signal and the reference signal remains within a preset range,
perform, using the frames of the reference signal, echo cancellation processing on the echo signal in the frames of the first voice signal, to generate frames of a second voice signal, and
output the frames of the second voice signal, wherein the estimated latency value is based on cross-correlation parameters, the cross-correlation parameters being determined based on a cross-correlation operation that is performed on first characteristic values of the frames of the first voice signal and second characteristic values of the frames of the reference signal.

9. The terminal according to claim 8, wherein the processing circuitry is further configured to
receive frames of a third voice signal,
buffer the frames of the third voice signal in a second buffer, wherein the frames of the first voice signal comprises at least a signal that is the same as the frames of the third voice signal,
obtain the frames of the third voice signal from the second buffer in a second timing period,
decode the frames of the third voice signal to generate the frames of the reference signal, and
add the generated frames of the reference signal to the reference signal queue.

10. The terminal according to claim 9, wherein the first timing period of the second timing period is obtained based on a frame length that is selected by an audio encoder performing encoding.

11. The terminal according to claim 9, wherein a buffer size of the first buffer is obtained based on a minimum buffer size of recording circuitry of an audio card in the terminal and a first buffer coefficient.

12. The terminal according to claim 11, wherein a buffer size of the second buffer is obtained based on a minimum buffer size of playback circuitry of the audio card in the terminal and a second buffer coefficient.

13. The terminal according to claim 12, wherein the processing circuitry is further configured to:
fill the playback circuitry of the audio card and the reference signal queue with temporary data when there is no usable voice signal in the first buffer in the first timing period, wherein the temporary data is a sequence including 0.

14. An echo cancellation method, comprising:
controlling playing, using processing circuitry of a terminal, of a reference signal obtained from another terminal, the reference signal including frames of a first signal;
collecting an echo signal, the echo signal being obtained when the reference signal is played, the echo signal including frames of a second signal;
determining, when the frames of the first signal are preprocessed, first characteristic values from the frames of the first signal and second characteristic values from the frames of the second signal;
determining cross-correlation parameters based on a cross-correlation operation performed, by the processing circuitry, on the first characteristic values of the frames of the first signal and the second characteristic values of the frames of the second signal;
determining an echo latency value based on the cross-correlation parameters; and
performing echo cancellation processing, by the processing circuitry, based on the echo latency value.

15. The method according to claim 14, wherein the performing of the echo cancellation processing further comprises:
performing a tracking filtering operation, by the processing circuitry, based on the cross-correlation parameters to obtain a filtering result;
determining the echo latency value based on the filtering result; and
performing the echo cancellation processing in a call using the echo latency value.

16. The method according to claim 15, wherein the determining the first characteristic values further comprises:
generating a first FFT parameter by performing a FFT transformation on the frames of the first signal;
obtaining a first sampling frequency value;
generating a first power spectrum corresponding to each of the frames of the first signal based on the first FFT parameter, the first sampling frequency value, and a first frequency parameter value, and extracting the first power spectrum; and
generating a smoothed value of the first power spectrum based on the first power spectrum corresponding to each of the frames of the first signal, and extracting the smoothed value.

17. The method according to claim 16, further comprising:
performing data binarization processing on the extracted first power spectrum corresponding to each of the frames of the first signal and the smoothed value of the first power spectrum;
recording a current value as 1 when the first power spectrum corresponding to each of the frames of the first signal is greater than the smoothed value of the first power spectrum, or otherwise, recording a current value as 0, wherein binarized data corresponding to each of the frames of the first signal is constructed by a combination of 1 and 0; and
performing multi-frame merging on the binarized data corresponding to each of the frames of the first signal to obtain a binary data merging value of the frames of the first signal.

18. The method according to claim 15, wherein the determining the second characteristic values further comprises:
generating a second FFT parameter by performing a FFT transformation on the frames of the second signal;
obtaining a second sampling frequency value;
generating a second power spectrum corresponding to each of the frames of the second signal based on the second FFT parameter, the second sampling frequency value, and a second frequency parameter value, and extracting the second power spectrum; and
generating a smoothed value of the second power spectrum based on the second power spectrum corresponding to each of the frames of the second signal, and extracting the smoothed value.

19. The method according to claim 18, further comprising:
performing data binarization processing on the extracted second power spectrum corresponding to each of the frames of the second signal and the smoothed value of the second power spectrum;
recording a current value as 1 when the second power spectrum corresponding to each of the frames of the second signal is greater than the smoothed value of the second power spectrum, or otherwise, recording a current value as 0, wherein binary data of each of the frames of the second signal is constructed by a combination of 1 and 0; and
performing multi-frame merging on the binarized data corresponding to each of the frames of the second signal to obtain a binary data merging value of the frames of the second signal.

20. The method according to claim 19, wherein the determining the cross-correlation parameters comprises:
extracting the first characteristic values of the frames of the first signal from a buffer; and
performing Xor and Sum processing on the first characteristic values of the frames of the first signal and the second characteristic values of the frames of the second signal.

21. The method according to claim 20, wherein the performing the tracking filtering operation further comprises:
performing weighted smoothing processing based on the cross-correlation parameters and a filtering coefficient to obtain the filtering result, wherein the filtering result comprises a plurality of values;
selecting a candidate latency value from the plurality of values according to a minimum rule; and
using, when the candidate latency value complies with an empirical value, the candidate latency value complying with the empirical value as the echo latency value.

22. A non-transitory computer storage medium, storing a computer executable instruction, the computer executable instruction being used to perform the echo cancellation method according to claim 14.

23. A terminal for echo cancellation, comprising:
processing circuitry configured to:
control playing of a reference signal obtained from another terminal, the reference signal including frames of a first signal,
collect an echo signal, the echo signal being obtained when the reference signal is played, the echo signal including frames of a second signal,
determine, when the frames of the first signal are preprocessed, first characteristic values from the frames of the first signal and second characteristic values from the frames of the second signal,
determine cross-reference parameters based on a cross-correlation operation performed on the first characteristic values of the frames of the first signal and the second characteristic values of the frames of the second signal,
determine an echo latency value based on the cross-reference parameters, and
perform echo cancellation processing based on the echo latency value.

24. The terminal according to claim 23, wherein the processing circuitry is further configured to:
perform a tracking filtering operation based on the cross-correlation parameters to obtain a filtering result,
obtain the echo latency value based on the filtering result, and
perform the echo cancellation processing in a call using the echo latency value.

25. The terminal according to claim 24, wherein the processing circuitry is further configured to:
generate a first FFT parameter by performing a FFT transformation on the frames of the first signal,
obtain a first sampling frequency value,
generate a first power spectrum corresponding to each of the frames of the first signal based on the first FFT parameter, the first sampling frequency value, and a first frequency parameter value, and extract the first power spectrum, and
generate a smoothed value of the first power spectrum based on the first power spectrum corresponding to each of the frames of the first signal, and extract the smoothed value.

26. The terminal according to claim 25, wherein the processing circuitry is further configured to:
perform data binarization processing on the extracted first power spectrum corresponding to each of the frames of the first signal and the smoothed value of the first power spectrum,
record a current value as 1 when the first power spectrum corresponding to each of the frames of the first signal is greater than the smoothed value of the first power spectrum, or otherwise, record a current value as 0, wherein binary data of each of the frames of the first signal is constructed by a combination of 1 and 0, and
perform multi-frame merging on the binarized data corresponding to each of the frames of the first signal to obtain a binary data merging value of the frames of the first signal.

27. The terminal according to claim 24, wherein the processing circuitry is further configured to:
generate a second FFT parameter by performing a FFT transformation on the frames of the second signal,
obtain a second sampling frequency value,
generate a second power spectrum corresponding to each of the frames of the second signal based on the second FFT parameter, the second sampling frequency value, and a second frequency parameter value, and extract the second power spectrum, and
generate a smoothed value of the second power spectrum based on the second power spectrum corresponding to each of the frames of the second signal, and extract the smoothed value.

28. The terminal according to claim 27, wherein the processing circuitry is further configured to:
perform data binarization processing on the extracted second power spectrum corresponding to each of the frames of the second signal and the smoothed value of the second power spectrum,
record a current value as 1 when the second power spectrum corresponding to each of the frames of the second signal is greater than the smoothed value of the second power spectrum; otherwise, record a current value as 0, wherein binary data of each of the frames of the second signal is constructed by a combination of 1 and 0, and perform multi-frame merging on the binarized data corresponding to each of the frames of the second signal to obtain a binary data merging value of the frames of the second signal.

29. The terminal according to claim 28, wherein the processing circuitry is further configured to:
extract the first characteristic values of the frames of the first signal from a buffer, and
perform Xor and Sum processing on the first characteristic values of the frames of the first signal and the second characteristic values of the frames of the second signal.

30. The terminal according to claim 29, wherein the processing circuitry is further configured to:
perform weighted smoothing processing based on the cross-correlation parameters and a filtering coefficient to obtain the filtering result, wherein the filtering result comprises a plurality of values;
select a candidate latency value from the plurality of values according to a minimum rule; and
use, when the candidate latency value complies with an empirical value, the candidate latency value complying with the empirical value as the echo latency value.

* * * * *